(12) United States Patent
Huang et al.

(10) Patent No.: US 11,074,674 B2
(45) Date of Patent: Jul. 27, 2021

(54) IMAGING NOISE REDUCTION SYSTEM AND METHOD

(71) Applicant: Purdue Research Foundation, West Lafayette, IN (US)

(72) Inventors: Fang Huang, West Lafayette, IN (US); Sheng Liu, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 61 days.

(21) Appl. No.: 16/480,258

(22) PCT Filed: Jan. 29, 2018

(86) PCT No.: PCT/US2018/015795
§ 371 (c)(1),
(2) Date: Jul. 23, 2019

(87) PCT Pub. No.: WO2018/140900
PCT Pub. Date: Aug. 2, 2018

(65) Prior Publication Data
US 2019/0385280 A1    Dec. 19, 2019

Related U.S. Application Data

(60) Provisional application No. 62/452,326, filed on Jan. 30, 2017.

(51) Int. Cl.
*G06T 5/00* (2006.01)
*G06T 5/10* (2006.01)
*G06T 5/20* (2006.01)

(52) U.S. Cl.
CPC ............... *G06T 5/002* (2013.01); *G06T 5/10* (2013.01); *G06T 5/20* (2013.01); *G06T 2207/20056* (2013.01)

(58) Field of Classification Search
None
See application file for complete search history.

(56) References Cited

U.S. PATENT DOCUMENTS 7,009,636 B2 *  3/2006  Liu ................... H04N 5/23248
                                              348/208.1
8,346,008 B2 *  1/2013  Lin ................... H04N 5/35509
                                              382/274

(Continued)

FOREIGN PATENT DOCUMENTS

JP    A2016518747    6/2016

OTHER PUBLICATIONS

Sotthivirat, Saowapak, and Jeffrey A. Fessler. "Penalized-likelihood image reconstruction for digital holography." JOSA A 21.5 (2004): 737-750. (Year: 2004).*

(Continued)

*Primary Examiner* — Andrae S Allison
(74) *Attorney, Agent, or Firm* — Piroozi-IP, LLC

(57) ABSTRACT

A system for reducing noise in a camera image is disclosed. The system includes one or more processors, and a camera operatively coupled to the processor, the processors are configured to reduce noise of camera images, the processors are configured to receive input image data from the camera representing pixel data from a plurality of pixels, segment the input image data to a plurality of segments and for each segment establish an initial segment image, pre-correct pixel data by modifying the pixel data to account for voltage offset and gain of each pixel based on a predetermined map of gain and offset, and obtain an estimate of an output image by minimizing a cost function and output and stitch the estimated image to other estimated and outputted image segments, and output a noise reduced image including the stitched estimated images.

22 Claims, 32 Drawing Sheets

(56) References Cited

U.S. PATENT DOCUMENTS

| | | | |
|---|---|---|---|
| 8,665,361 B1* | 3/2014 | Rangarajan | H04N 5/2256 348/370 |
| 9,613,442 B2* | 4/2017 | Pan | G06T 11/005 |
| 2002/0074499 A1* | 6/2002 | Butler | G01J 5/20 250/338.1 |
| 2005/0111751 A1* | 5/2005 | Avinash | G06T 5/002 382/275 |
| 2011/0052030 A1* | 3/2011 | Bruder | A61B 6/4014 382/131 |
| 2015/0110405 A1 | 4/2015 | Tezaur | |
| 2016/0044255 A1* | 2/2016 | Bewersdorf | H04N 5/378 348/241 |

OTHER PUBLICATIONS

Y. Matsuo, S. Iwasaki, Y. Yamamura and J. Katto, "Wavelet domain image super-resolution from digital cinema to ultrahigh definition television by dividing noise component," 2012 Visual Communications and Image Processing, San Diego, CA, USA, 2012, pp. 1-6, doi: 10.1109/VCIP.2012.6410830. (Year: 2012).*

Sotthivirat, "Penalized-Likelihood Image Reconstruction for Digital Holography," Optical Society of America, 2004, vol. 21, Issue 5.

Cubukcu. "Root Raised Cosine (RRC) Filters and Pulse Shaping in Communication Systems," Avionics Systems Analysis, NASA, May 18, 2012.

Wijn, "Image Processing and Fourier Analysis," Utrecht University Netherlands, Nov. 14, 2010, Utrecht University Netherlands, Nov. 14, 2010.

* cited by examiner

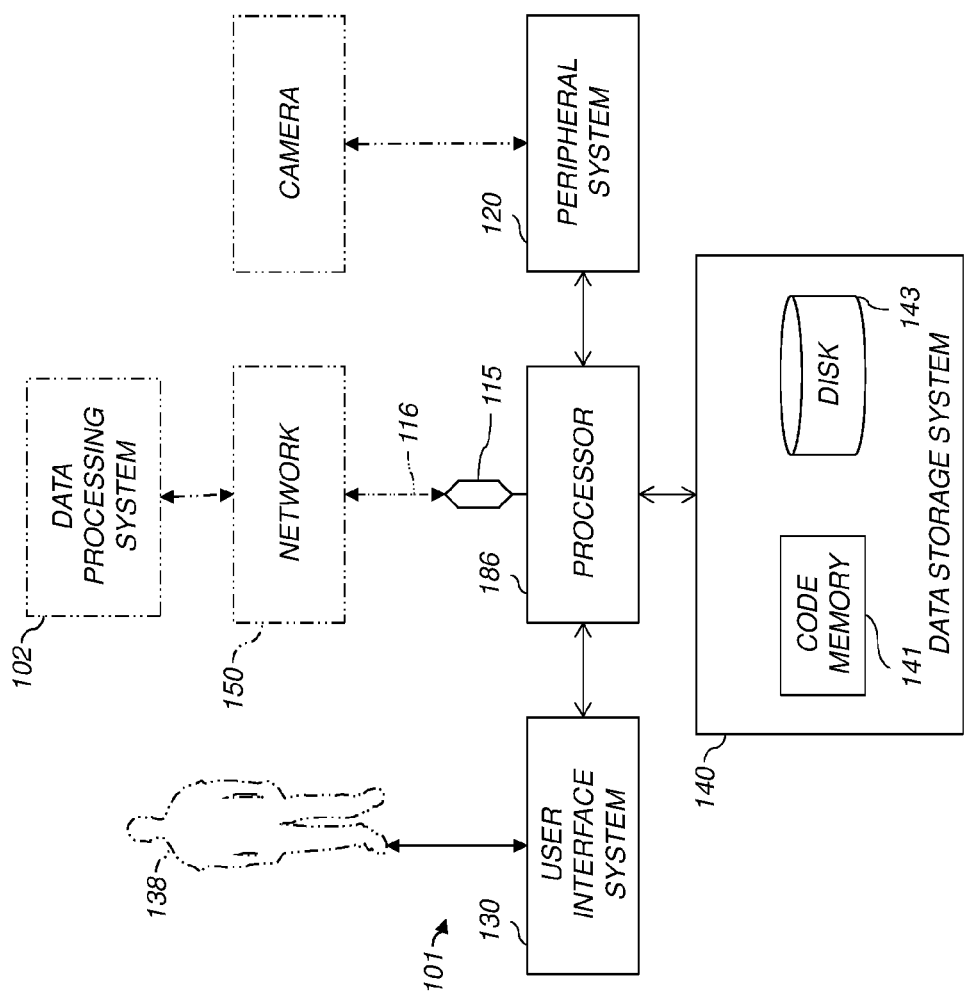

IMAGING NOISE REDUCTION SYSTEM AND METHOD

CROSS-REFERENCE TO RELATED APPLICATIONS

The present patent application is a 35 U.S.C. § 371 Nationalization Application of and claims the priority benefit of the International Patent Application Serial No. PCT/US18/15795 filed Jan. 29, 2018, which is related to and claims the priority benefit of the Provisional Patent Application Ser. No. 62/452,326 filed Jan. 30, 2017, the contents of each of which are hereby incorporated by reference in its entirety into the present disclosure.

STATEMENT REGARDING GOVERNMENT FUNDING

The invention was made with government support under Grant Nos. GM119785 awarded by the National Institutes of Health and under Grant No. HR0011-62-3-6230 awarded by the Defense Advanced Research Projects Agency. The government has certain rights in the invention.

TECHNICAL FIELD

The present application relates to imaging devices, and in particular to complementary metal-oxide semiconductor (CMOS), charged-coupled device (CCD), electron-multiplying CCDs (EMCCD), and other imaging devices including array sensors.

BACKGROUND

This section introduces aspects that may help facilitate a better understanding of the disclosure. Accordingly, these statements are to be read in this light and are not to be understood as admissions about what is or is not prior art.

Scientific complementary metal-oxide semiconductor (sCMOS) cameras are rapidly gaining popularity in the biological sciences. The sCMOS sensor provides significant advances in imaging speed, sensitivity and field of view over traditional detectors such as charge-coupled devices (CCD) or electron-multiplying CCDs (EMCCD). A primary difference between these two classes of sensors includes how charge generated by each sensor (i.e., pixel) from the photon-electric conversion process, is managed. In CCD and EMCCD, In CCD and EMCCD, accumulated charge at each sensor is transported across the array of sensors, while for sCMOS and CMOS arrays in general, a few transistors pre-amplify and convert the analog signal associated with the pre-amplified analog signal into a digital signal (ADC). Some advantages of one technology vs. another include CCD-based technologies can produce high quality low noise images, while CMOS-based technologies are more susceptible to noise. In the CMOS-based technologies, less number of photons hit the sensor per unit area, as some of the area is occupied by the pre-amplified and ADC transistors. CCD-based technologies consume higher power (to the tune of two order of magnitude). CMOS-based sensors can be manufactured on a variety of semiconductor fabrication facilities, whereas CCD-based technologies are more mature.

Since with the CMOS-based technologies, the CMOS sensor introduces pixel-dependent noise, each pixel has its own noise statistics—primarily offset, gain and variance. Left uncorrected, this sCMOS-specific noise generates imaging artifacts and biases in quantification and visualization. A suite of algorithms was developed to characterize this noise in each pixel and incorporate the noise statistics in the likelihood function for single-molecule localization. However, these algorithms work exclusively on images with point objects such as in single-particle tracking or single-molecule-switching nanoscopy. No general algorithm that works on conventional microscopy images or otherwise generic images with arbitrary shapes exists.

Therefore, there is an unmet need for an algorithm and system that dramatically reduces noise from microscopy images which include arbitrary structures for both CCD- and CMOS-based technologies.

SUMMARY

A system for reducing noise in a camera image is disclosed. The system includes one or more processors, and a camera with an electronic detector operatively coupled to the processor, the processors are configured to reduce noise of camera images, the processors are configured to receive input image data from the camera representing pixel data from a plurality of pixels, segment the input image data to a plurality of segments and for each segment establish an initial segment image, pre-correct pixel data by modifying the pixel data to account for voltage offset and gain of each pixel based on a predetermined map of gain and offset, and obtain an estimate of an output image by minimizing a cost function and output and stitch the estimated image to other estimated and outputted image segments, and output a noise reduced image including the stitched estimated images.

According to one embodiment, in the above system the step of estimating an output image includes: A—obtain a noise mask for the segment; B—obtain discrete Fourier transform (DFT) of an iterated segment image; C—obtain a noise contribution in the segment by applying the noise mask to the DFT of the segment; D—calculate a negative log-likelihood function for the segment based on pixel values, wherein the negative log-likelihood function represents a negative similarity (likelihood) measure using statistics between the iterated segment image and initial segment image; E—calculate a cost function by adding the noise contribution to the negative log-likelihood function; F—minimize the cost function by adjusting pixel values and thereby obtaining a new iterated segment image and repeating steps B-E in an iteration-minimization process; and G—output a noise reduced segment image when the cost function is minimized.

According to one embodiment, in the above system the noise mask is based on an optical transfer function (OTF) of the camera.

According to one embodiment, in the above system the noise mask is based on a high-pass raised-cosine filter represented by $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$, M is the noise mask and $\beta$ and T are adjustable parameters based on NA and $\gamma$ in which NA represent numerical aperture and $\lambda$ represents the detection wavelength. Two types of OTF masks are considered. A first mask is referred to as OTF-weighted mask, where $\beta=1$ and $T=\lambda/5.6NA$. The other one is referred to as the noise-only mask, where $\beta=0.2$ and $T=(1-\beta)/4NA$.

According to one embodiment, in the above system the high-pass raised-cosine filter is based on an OTF-weighted mask, expressed by $\beta=1$ and $T=\lambda/5.6NA$.

According to one embodiment, in the above system the high-pass raised-cosine filter is based on an OTF noise-only mask, express by $\beta=0.2$ and $T=(1-\beta)\lambda/4NA$.

According to one embodiment, in the above system the high-pass raised-cosine filter is based on an adjustable OTF mask, express by $$\beta = \frac{\frac{\pi}{2}\left(\frac{k_{max}}{w_0}-1\right)}{\mathrm{acos}(1-2h)+\frac{\pi}{2}\left(\frac{k_{max}}{w_0}-1\right)},$$

$$T = \frac{1-\beta}{2w_0},$$

$$k_{max} = \frac{\sqrt{2}}{2 pixelsize}, \quad w_0 = \frac{wNA}{\lambda},$$

where, the width w can be adjusted from $10^{-6}$ to 2 and the height h can be adjusted from 0 to 1.

According to one embodiment, in the above system the high-pass raised-cosine filter is based on an adjustable mask that is based on at least two parameters: width and height.

According to one embodiment, in the above system the width can vary from $10^{-6}$ to 2 NA/$\lambda$, and the height can vary 0.7 to 1.

According to one embodiment, in the above system the high-pass raised-cosine filter is based on user defined-mask.

According to one embodiment, in the above system the predetermined map of gain and offset is provided by the camera manufacturer or is obtained by characterizing each pixel of the plurality.

According to one embodiment, in the above system the pre-correction is performed by:

$$D_i = \frac{A_i - o_i}{g_i}$$

where $D_i$ is the pre-corrected pixel data i, $A_i$ represents the uncorrected pixel, $o_i$ represents offset for pixel i and $g_i$ represents gain for pixel i.

According to one embodiment, in the above system the DFT of an L×L image is represented by:

$$\hat{\mu}(k_x, k_y) = \frac{1}{L}\sum_{\substack{m=-L/2 \\ n=-L/2}}^{L/2-1} \mu(x,y)e^{-i2\pi k_x x}e^{-i2\pi k_y y},$$

where x=m$\Delta$x, y=n$\Delta$y, kx=p/L$\Delta$x, ky=q/L$\Delta$y, m, n, p, q are indexes incremented by 1, p, q$\in$[-L/2, L/2-1], and $\Delta$x and $\Delta$y represent the pixel size of the image in two dimensions.

According to one embodiment, in the above system $\Delta$x is substantially the same as $\Delta$y.

According to one embodiment, in the above system the noise contribution is represented by:

$$\sigma_N = \sum_{k_x,k_y} |\hat{\mu}(k_x,k_y)M(k_x,k_y)|^2.$$

According to one embodiment, in the above system a likelihood function is represented by:

$$L(\mu, \gamma | D, \gamma) = \prod_{i=1}^{N} \frac{e^{-(\mu_i+\gamma_i)}(\mu_i+\gamma_i)^{(D_i+\gamma_i)}}{\Gamma(D_i+\gamma_i+1)}$$

where i is a pixel index, N is the number of pixels of an image, $\gamma_i$ is a calibration quantity.

According to one embodiment, in the above system $\gamma_i$ is $\sigma_i^2/g_i^2$, where $\sigma_i^2$ and $g_i$ are variance and gain of pixel i, respectively.

According to one embodiment, in the above system the negative log-likelihood function is expressed by:

$$LLs = \sum_{i=1}^{N}[\mu_i - (D_i+\gamma_i)\ln(\mu_i+\gamma_i)]$$

where $D_i$ is the pre-corrected pixel data expressed by $$D_i = \frac{A_i - o_i}{g_i}$$

where $A_i$ represents the uncorrected pixel, $o_i$ represents offset for pixel i and $g_i$ represents gain for pixel i.

According to one embodiment, in the above system the segmentation of the input image is based on segments of sizes between 1×1 to a maximum size of the camera's detector.

According to one embodiment, in the above system camera-added noise is reduced by up to about 80%.

A method of reducing noise from a camera image is also disclosed. The method includes receiving an input image data from the camera having an electronic detector representing pixel data from a plurality of pixels, segmenting the input image data to a plurality of segments, for each segment of the plurality: establishing an initial segment image, pre-correcting pixel data by modifying the pixel data to account for voltage offset and gain of each pixel based on a predetermined map of gain and offset, obtaining an estimate of an output image by minimizing a cost function and output and stitch the estimated image to other estimated and outputted image segments, and outputting a noise reduced image including the stitched estimated images.

According to one embodiment, in the above method the step of estimating an output image includes: A—obtaining a noise mask for the segment; B—obtaining discrete Fourier transform (DFT) of an iterated segment image C—obtaining a noise contribution in the segment by applying the noise mask to the DFT of the segment; D—calculating a negative log-likelihood function for the segment based on pixel values, wherein the negative log-likelihood function represents a negative similarity (likelihood) measure using statistics between the iterated segment image and initial segment image; E—calculating a cost function by adding the noise contribution to the negative log-likelihood function;

F—minimizing the cost function by adjusting pixel values and thereby obtaining a new iterated segment image and repeating steps B-E in an iteration-minimization process; and G—outputting a noise reduced segment image when the cost function is minimized.

According to one embodiment, in the above method the noise mask is based on an optical transfer function (OTF) of the camera.

According to one embodiment, in the above method the noise mask is based on a high-pass raised-cosine filter represented by $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$, M is the noise mask and $\beta$ and T are adjustable parameters based on NA and $\gamma$ in which NA represent numerical aperture and $\lambda$ represents the detection wavelength.

According to one embodiment, in the above method the high-pass raised-cosine filter is based on an OTF-weighted mask, expressed by $\beta=1$ and $T=\lambda/5.6NA$.

According to one embodiment, in the above method the high-pass raised-cosine filter is based on an OTF noise-only mask, express by $\beta=0.2$ and $T=(1-\beta)\lambda/4NA$.

According to one embodiment, in the above method the high-pass raised-cosine filter is based on an adjustable OTF mask, express by:

$$\beta = \frac{\frac{\pi}{2}\left(\frac{k_{max}}{w_0} - 1\right)}{a\cos(1-2h) + \frac{\pi}{2}\left(\frac{k_{max}}{w_0} - 1\right)},$$

$$T = \frac{1-\beta}{2w_0},$$

$$k_{max} = \frac{\sqrt{2}}{2 \text{ pixelsize}}, \quad w_0 = \frac{wNA}{\lambda},$$

where, the width w can be adjusted from $10^{-6}$ to 2 and the height h can be adjusted from 0 to 1.

According to one embodiment, in the above method the high-pass raised-cosine filter is based on an adjustable mask that is based on at least two parameters: width and height.

According to one embodiment, in the above method the width can vary from $10^{-6}$ to 2 NA/$\lambda$, and the height can vary 0.7 to 1.

According to one embodiment, in the above method the high-pass raised-cosine filter is based on user defined-mask.

According to one embodiment, in the above method the predetermined map of gain and offset is provided by the camera manufacturer or is obtained by characterizing each pixel of the plurality.

According to one embodiment, in the above method the pre-correction is performed by:

$$D_i = \frac{A_i - o_i}{g_i}$$

where $D_i$ is the pre-corrected pixel data i, $A_i$ represents the uncorrected pixel, $o_i$ represents offset for pixel i and $g_i$ represents gain for pixel i.

According to one embodiment, in the above method the DFT of an L×L image is represented by:

$$\hat{\mu}(k_x, k_y) = \frac{1}{L} \sum_{\substack{m=-L/2 \\ n=-L/2}}^{L/2-1} \mu(x, y) e^{-i2\pi k_x x} e^{-i2\pi k_y y},$$

where $x=m\Delta x$, $y=n\Delta y$, $kx=p/L\Delta x$, $ky=q/L\Delta y$, m, n, p, q are indexes incremented by 1, p, $q \in [-L/2, L/2-1]$, and $\Delta x$ and $\Delta y$ represent the pixel size of the image in two dimensions.

According to one embodiment, in the above method the $\Delta x$ is substantially the same as $\Delta y$.

According to one embodiment, in the above method the noise contribution is represented by:

$$\sigma_N = \sum_{k_x, k_y} |\hat{\mu}(k_x, k_y) M(k_x, k_y)|^2.$$

According to one embodiment, in the above method a likelihood function is represented by:

$$L(\mu, \gamma | D, \gamma) = \prod_{i=1}^{N} \frac{e^{-(\mu_i+\gamma_i)}(\mu_i+\gamma_i)^{(D_i+\gamma_i)}}{\Gamma(D_i + \gamma_i + 1)}$$

where i is a pixel index, N is the number of pixels of an image, $\gamma_i$ is a calibration quantity.

According to one embodiment, in the above method $\gamma_i$ is $\sigma_i^2/g_i^2$, where $\sigma_i^2$ and $g_i$ are variance and gain of pixel i, respectively.

According to one embodiment, in the above method the negative log-likelihood function is expressed by:

$$LLs = \sum_{i=1}^{N} [\mu_i - (D_i + \gamma_i)\ln(\mu_i + \gamma_i)]$$

where $D_i$ is the pre-corrected pixel data expressed by $$D_i = \frac{A_i - o_i}{g_i}$$

where $A_i$ represents the uncorrected pixel, $o_i$ represents offset for pixel i and $g_i$ represents gain for pixel i.

According to one embodiment, in the above method the segmentation of the input image is based on segments of sizes between 1×1 to a maximum size of the camera's detector.

According to one embodiment, in the above method wherein camera-added noise is reduced by up to about 80%.

BRIEF DESCRIPTION OF DRAWINGS

FIG. 3A is a single sCMOS frame pre-corrected for gain and offset is provided for comparison purpose with an exposure time of 10 ms and at time point t=0 s. FIG. 3B is a time series of selected regions in FIG. 3A from sCMOS frames is provided as well as the corresponding noise reduction frames showing significant reduction of sCMOS noise while maintaining the underlying signal.

With reference to FIG. 4B, a flowchart of a method is depicted for generating a noise-reduced image based on estimates by minimizing a cost function for individual segments of an input image. With reference to FIG. 4C, another flow chart is shown depicting the steps of the estimation shown in FIG. 4B.

FIG. 5A is a set of frames of peroxisome membrane proteins in COS-7 cells tagged with tdEos which were imaged on a conventional wide-field fluorescence microscope. FIG. 5A shows a temporal standard deviation map over 400 sCMOS frames, NCS frames with OTF weighted mask and noise only mask (left panel, center panel, and right panel, respectively). FIG. 5B are frames of average of a sequence of sCMOS and NCS frames as in FIG. 5A and their corresponding amplitudes in real apace (top panels) and Fourier space (bottom panels). FIG. 5C provides a graph of radial average of amplitude vs. normalized frequency in Fourier space from the sCMOS and NCS frames (NCS frames with OTF weighted mask and noise only mask).

FIG. 6A is a comparison of sCMOS frames and NCS frames of conventional fluorescence images of EB3-tdEos in COS-7 cells. FIG. 6B is a comparison of ideal, sCMOS frames and NCS frames of simulated microtubule images.

FIG. 7A shows experimental data associated with 100 nm yellow-green fluorescent bead images from sCMOS camera and NCS corrected images. FIG. 7B shows normalized intensity vs. pixel number graphs for intensity profiles generated by averaging over the vertical dimension of each bead image and fitted with a Gaussian function to extract their widths, σsCMOS and σNCS. FIG. 7C shows simulated data based on simulation parameters. FIG. 7D shows normalized intensity vs. pixel number graphs for intensity profiles for the simulated data.

FIG. 9A is simulated microtubule images under conditions of no noise (ideal), with readout and Poisson noise (sCMOS), after noise correction (NCS), and with Poisson noise only (Poisson) (most left panel, left panel, right panel, and most right panel, respectively). FIG. 9B is a log-likelihood ratio map of each image of FIG. 9A. FIG. 9C shows histograms of LLRs of individual pixels in FIG. 9B under the conditions of sCMOS, NCS and Poisson.

FIG. 12A shows the amplitude in Fourier space of the simulated beads imaged at various sampling rates. The OTF radius is a constant, equal to 2NA/λ (red circle). The number of pixels with higher weight in the OTF-weighted mask (the gradient overlay) decreases with the sampling rate. FIG. 12B is a radial average plot of the OTF mask at various sampling rates. As the sampling rate decreases, the OTF mask is truncated more to the center. FIG. 12C shows the sCMOS frame and its corresponding NCS frame at various sampling rates.

FIG. 15A is a temporal STD map of 100 sCMOS frames. FIG. 15B is a temporal STD map of 100 NCS frames at various conditions.

FIG. 17 is a diagram showing the components of an example imaging system according to one embodiment.

DETAILED DESCRIPTION

Figure 1A:
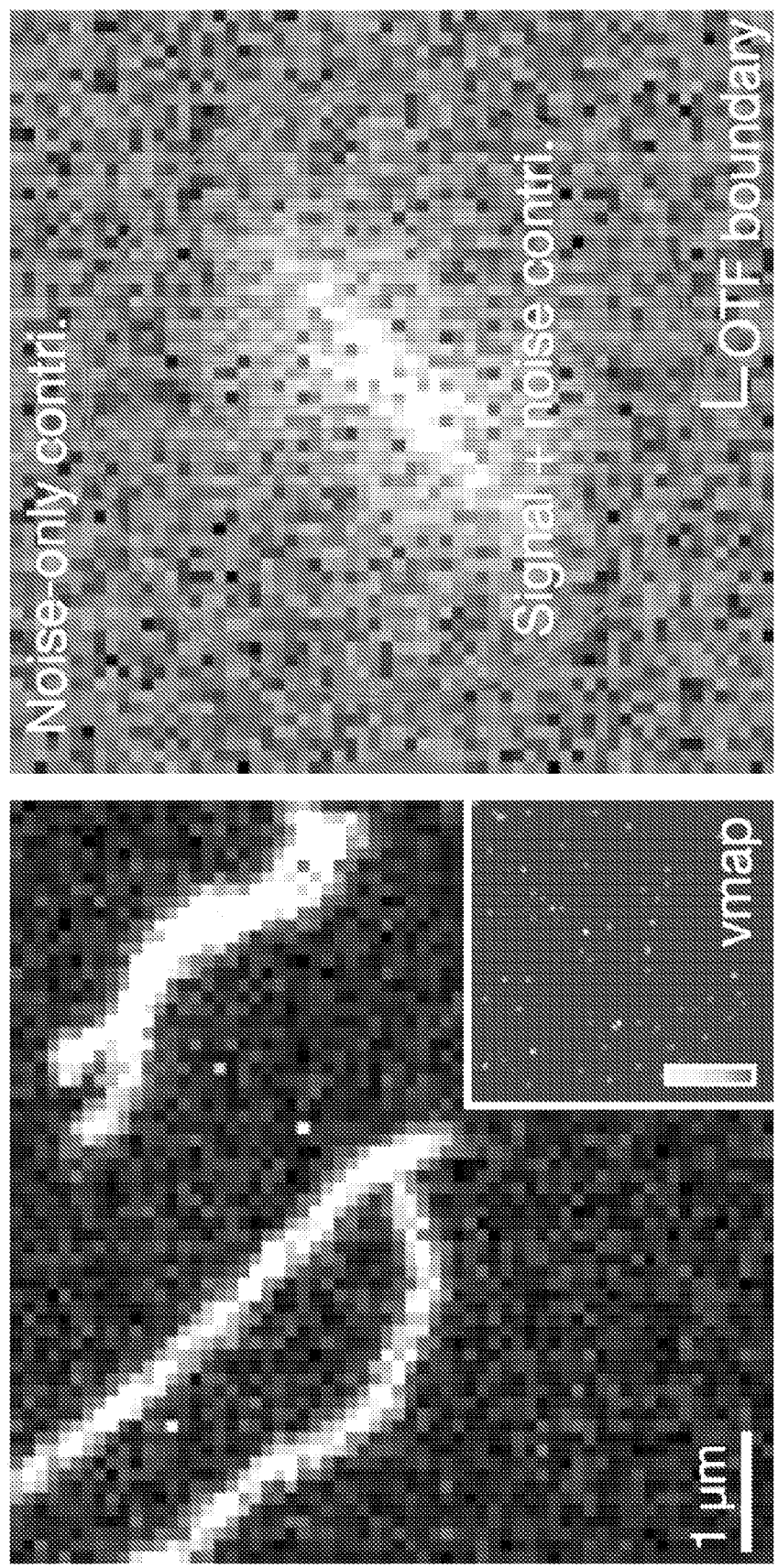
Referring to FIG. 1A, raw scientific complementary metal-oxide semiconductor (sCMOS) image and its components in Fourier space are shown, where in the left panel an arbitrary image is shown and in the right panel optical transfer function (OTF) boundary is shown within which exists both noise and signal and outside of which is only noise.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel algorithm and system is introduced herein that dramatically reduces noise from microscopy images which include arbitrary structures for both charge-coupled device (CCD)- and complementary metal-oxide semiconductor (CMOS)-based technologies. This novel method and system corrects pixel-dependent noise in a variety of microscopy fields to dramatically improve image quality.

An image recorded on a scientific complementary metal-oxide semiconductor (sCMOS) camera mainly contains two types of noise, the Poisson noise which originates from the quantum nature of light, and the readout noise which is introduced during the readout process of a camera. In comparison with electron-multiplying charged-coupled device (EMCCD) cameras which have ignorable effective readout noise but a significant electron multiplication noise, scientific CMOS (sCMOS) cameras have been characterized to have pixel-dependent camera statistics—each pixel has its own offset, variance and gain. This is largely due to independent readout units for each pixel while in EMCCD cameras, each pixel is processed serially using the same readout unit. Therefore, pixels on sCMOS cameras appear to 'flicker' even when there are no expected incident photons and the level of this noise changes drastically across pixels from 1-2 $ADU^2$ to 1000-2000 $ADU^2$ (ADU stands for analog to digital unit, the output count from the camera). This noise drastically reduces the image quality and makes quantitative study using sCMOS cameras a challenge, especially in applications that require efficient detection of low photon numbers, for example, in fluorescence microscopy, astronomy and hyperspectral detections.

A fundamental challenge for scientific CMOS (sCMOS), a class of CMOS-based imaging devices, in noise correction is the estimation of one of the two variables (with the sum of the variables known); each pixel from an sCMOS camera gives a digital count representing the sum of two variables given by photoelectrons and readout noise, which follow Poisson and Gaussian distributions, respectively. Photoelectron-based noise (also referred to as shot noise or Poisson's noise) is related to the quantum effects of few individual photons reaching a sensor. Readout noise is related to the electronic noise generated during the pre-amplification and analog to digital conversion (ADC), described above. In the case of detecting point emitters, photoelectrons form a diffraction-limited spot, modeled, e.g., as a Gaussian function. In the case of the pixel-dependent noise, a maximum-likelihood estimator can extract molecular centers with precision at the theoretical limit. With arbitrary structures, however, the assumption of single emitters is lost.

Figure 1B:
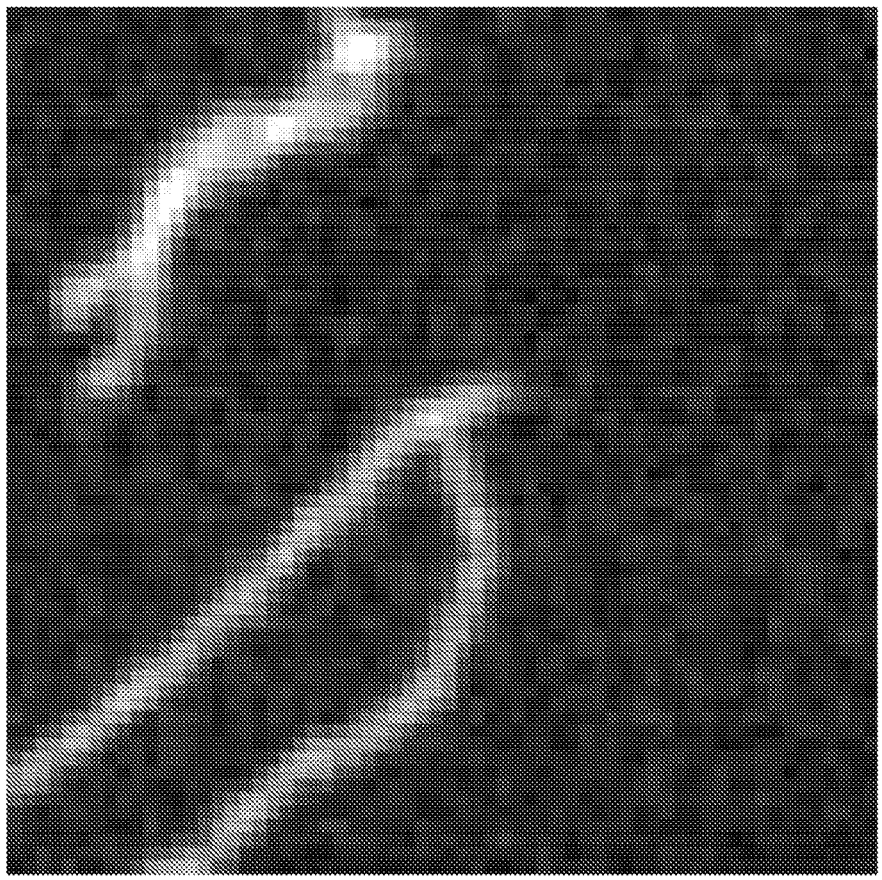
FIG. 1B is an image showing the noise corrected image of FIG. 1A.

A generalized noise-correction algorithm, according to the present disclosure uses optical transfer function (OTF). The OTF specifies how the imaging system treats different spatial frequencies. The support of the OTF, defined by the microscope's numerical aperture and the wavelength of detection, dictates the frequency-response limit of a microscope system. Optical signal from the sample exists only within the frequency limit, while only the contribution from noise lies outside of this limit. An example of this frequency limit is shown in FIG. 1A. Referring to FIG. 1A, raw sCMOS image and its components in Fourier space are shown, where in the left panel an arbitrary image is shown and in the right panel OTF boundary is shown within which exists both noise and signal and outside of which is only noise. The inset image of the left panel shows the variance map (vmap) of the readout noise. The image in Fourier space includes contributions (contri.) from both noise and signal. Map of variance map linearly scales from 2.8 to 2,000 camera count squared (analog to digital units (ADU)). Assuming independent readout noise, the algorithm according to the present disclosure minimizes the noise contribution and maximizes the likelihood of the image estimate to recover the underlying signal buried under the readout noise. This change is seen in FIG. 1B. Referring to FIG. 1B, an image showing the noise corrected image of FIG. 1A is provided. The algorithm according to the present disclosure first extracts the noise contribution of an image in Fourier space outside or near the theoretical OTF periphery, which represents a conservative estimate of the effective cutoff frequency of a practical system. Then, based on the sCMOS noise model—including the pixel dependent offset, gain and variance for sensors with multiple readout units per pixel) the likelihood function for the entire image is calculated. By minimizing the sum of the noise contribution in Fourier space and the negative log likelihood, a noise-corrected image is thus generated (example of which is shown in FIG. 1B), where the pixel-dependent noise is, to a large extent, undetectable in the recovered image.

Figure 2A:
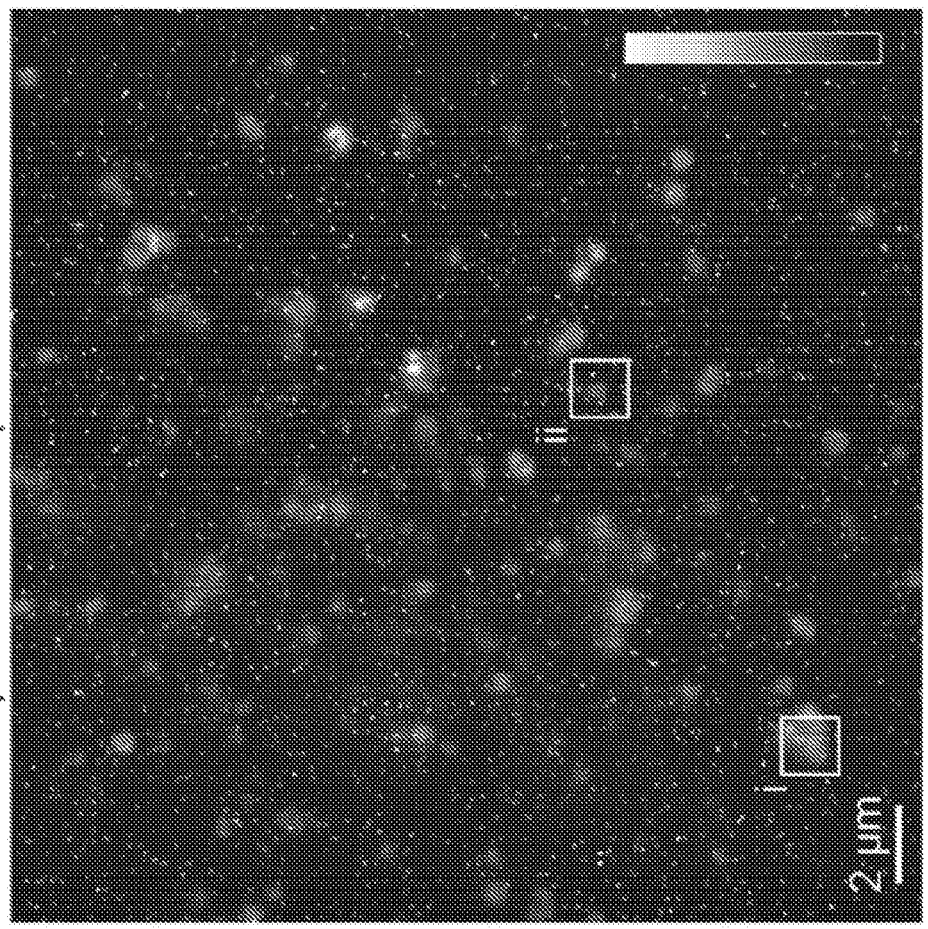
FIG. 2A is a temporal standard deviation (STD) map of over 400 sCMOS frames (pre-corrected by gain and offset). The map scale is from min (STD of 2.3, black) to max (STD of 12.3) in units of effective photon count.
Figure 2B:
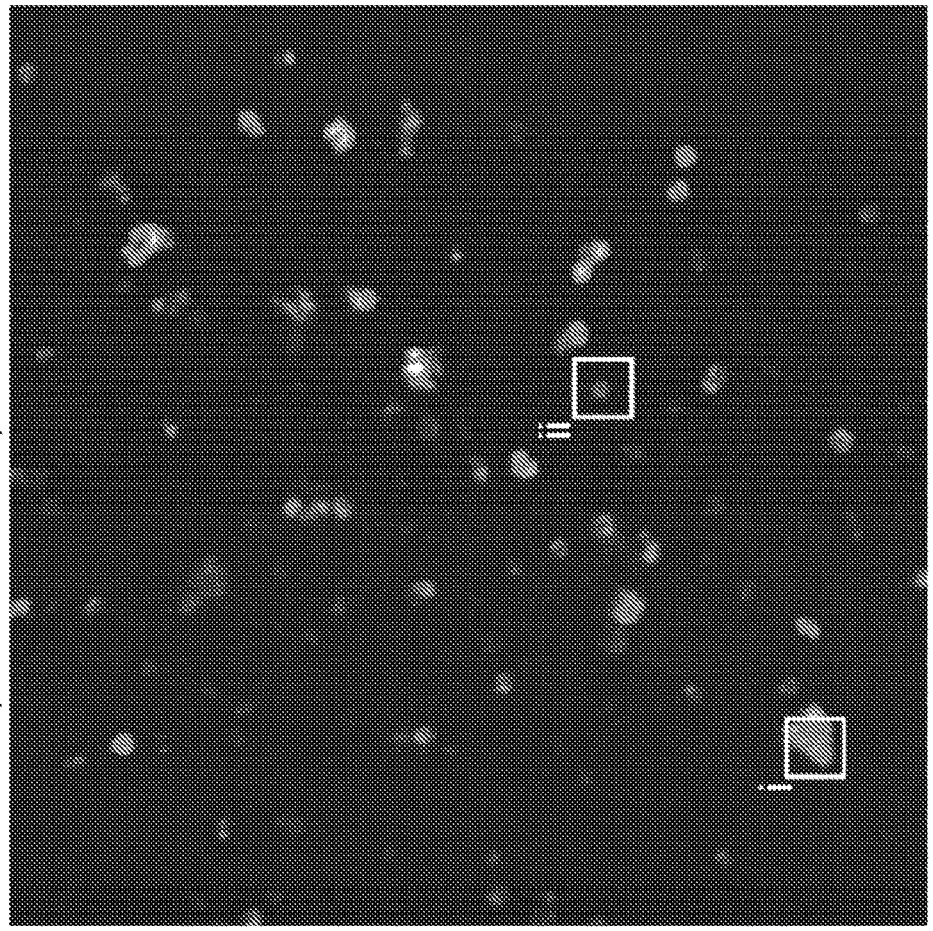
FIG. 2B is a temporal STD map of over 400 noise correction (alternatively identified as NCS herein) for an sCMOS camera frames.
Figure 2C:
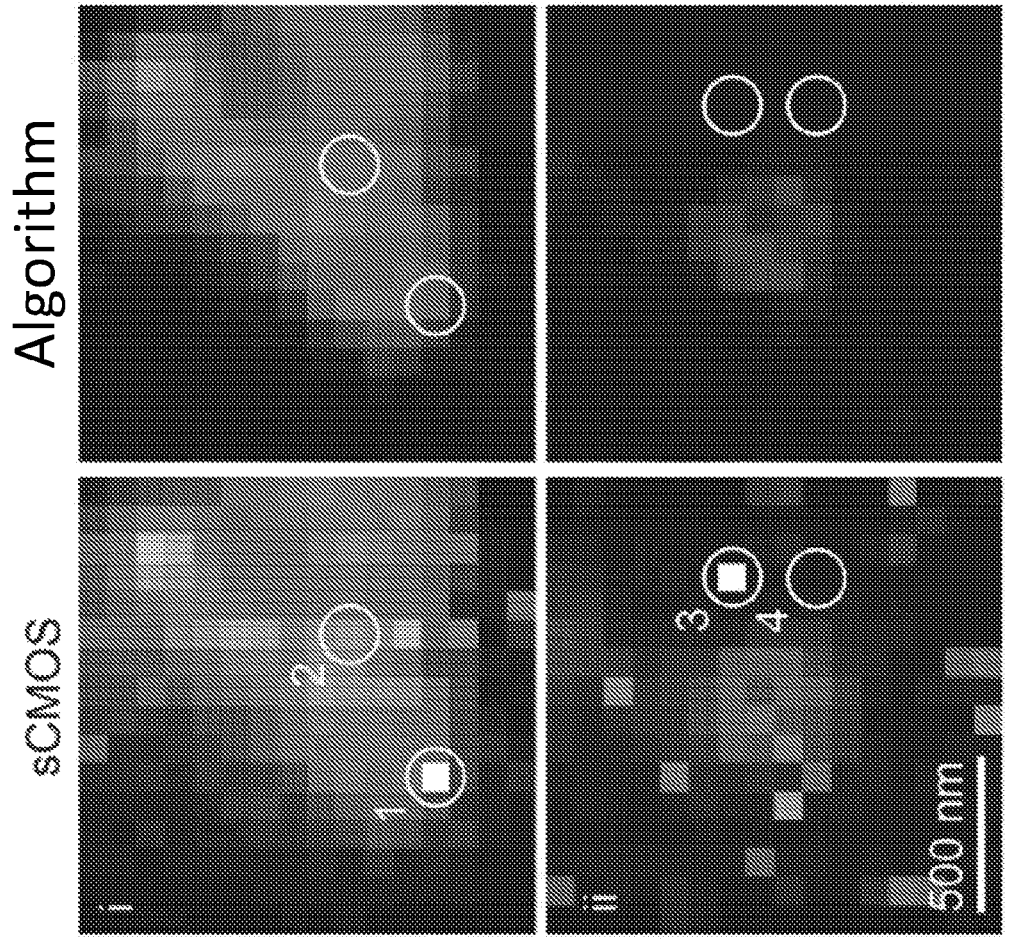
FIG. 2C is a zoom-in view of regions i and ii (left panels, top left for i and bottom left for ii) from FIGS. 2A and 2B and further zoomed-in images (right panels) which show pixels with high variance are effectively removed after noise reduction.
Figure 2D:
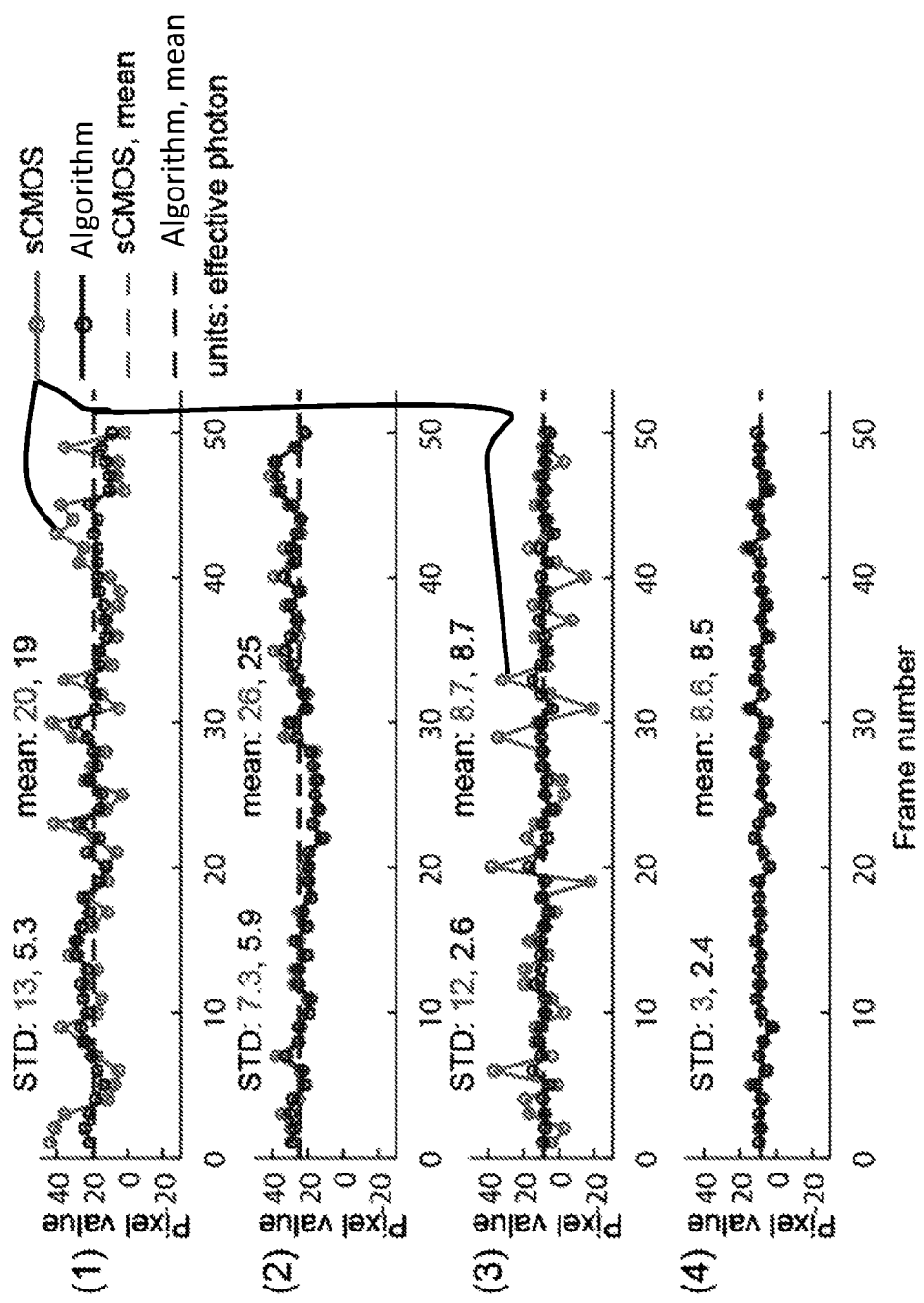
FIG. 2D is the pixel intensity traces of selected pixels from cropped regions i and ii of over 50 frames.

Referring to FIGS. 2A-2D, a set of exemplary images showing temporal fluctuations of fluorescence microscopy images of a peroxisome membrane proteins in COS-7 cells tagged with tdEos on a conventional wide-field fluorescence microscope are provided. In particular, FIG. 2A shows a temporal standard deviation (STD) map of over 400 sCMOS frames (pre-corrected by gain and offset). The map scale is from min (STD of 2.3, black) to max (STD of 12.3) in units of effective photon count. Referring to FIG. 2B, a temporal STD map of over 400 noise correction (alternatively identified as NCS herein) for sCMOS camera frames is shown. Referring to FIG. 2C, a zoom-in view of regions i and ii (left panels, top left for i and bottom left for ii) from FIGS. 2A and 2B and further zoomed-in images (right panels) show pixels with high variance are effectively removed after noise reduction (discussed below). Referring to FIG. 2D, the pixel intensity traces of selected pixels from cropped regions i and ii over 50 frames are shown. For the pixels with high readout noise (pixel 1 and 3), the value fluctuation decreases significantly after the noise reduction, while for the pixels with low readout noise (pixel 2 and 4), the pixel value fluctuation remains about the same. The mean pixel values stay about the same in both high and low readout noise cases before and after noise correction.

Figure 3A:
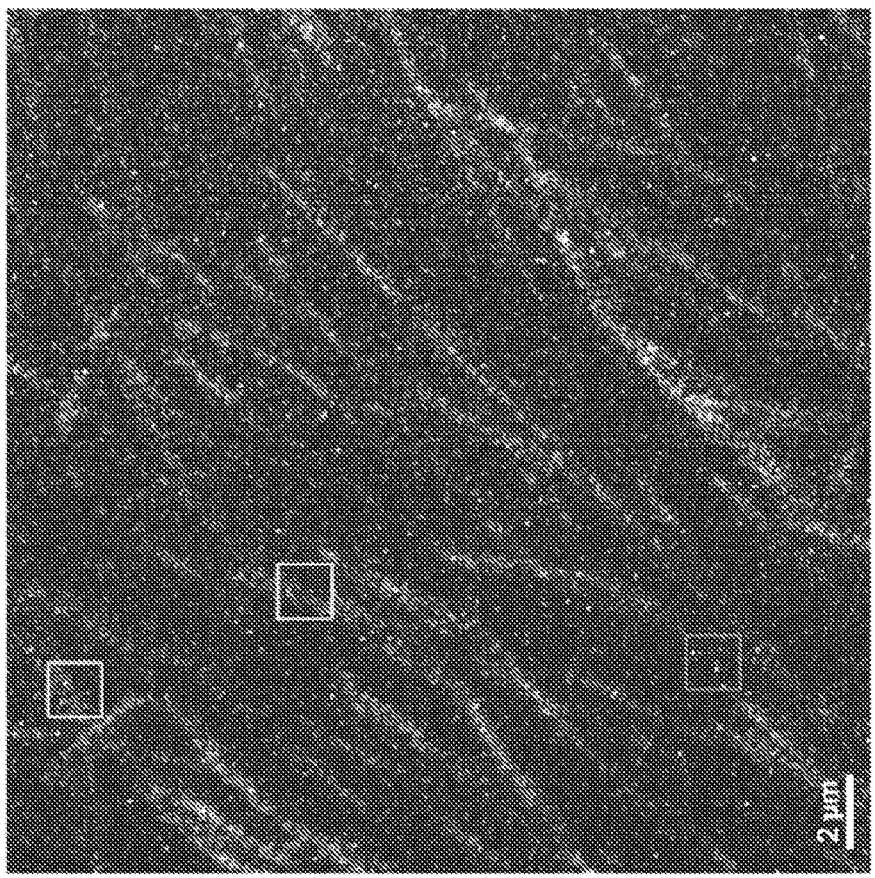
FIGS. 3A and 3B are pixel fluctuation comparisons for before and after noise correction at low photon levels as end-binding protein 3 in COS-7 cells tagged with tdEos were imaged on a conventional widefield fluorescence microscope.
Figure 3B:
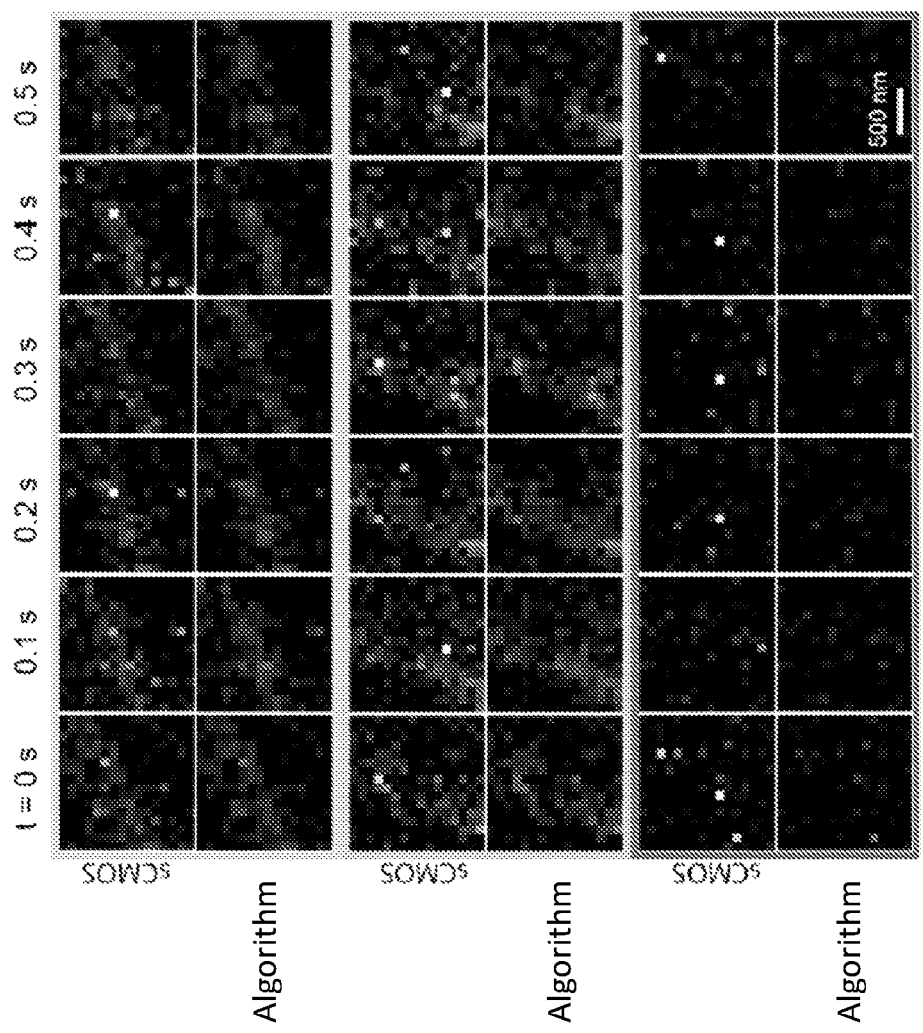

Referring to FIGS. 3A and 3B, pixel fluctuation comparisons are provided for before and after noise correction at low photon levels as end-binding protein 3 in COS-7 cells tagged with tdEos were imaged on a conventional widefield fluorescence microscope. Referring to FIG. 3A, a single sCMOS frame pre-corrected for gain and offset is provided for comparison purpose with an exposure time of 10 ms and at time point t=0 s. Referring to FIG. 3B, a time series of selected regions in FIG. 3A from sCMOS frames is provided as well as the corresponding noise reduction frames showing significant reduction of sCMOS noise while maintaining the underlying signal.

Figure 4A:
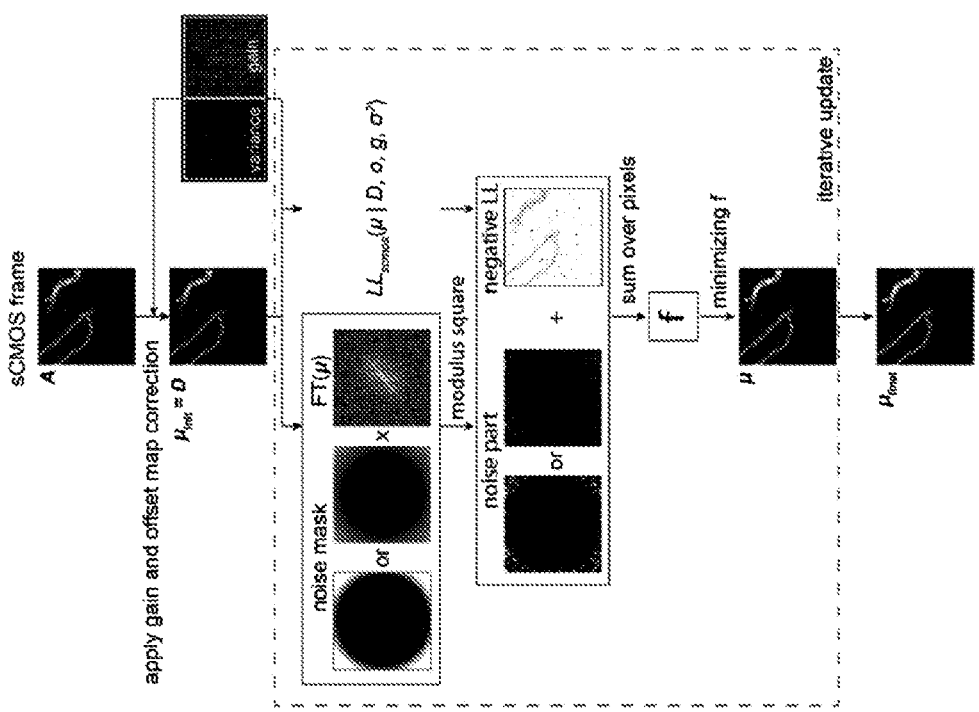
FIGS. 4A, 4B, and 4C are a schematic a flowchart, and another flowchart, respectively, providing the steps of noise reduction algorithm (typical referred to as NCS in the present disclosure) according to the present disclosure.
Figure 4B:
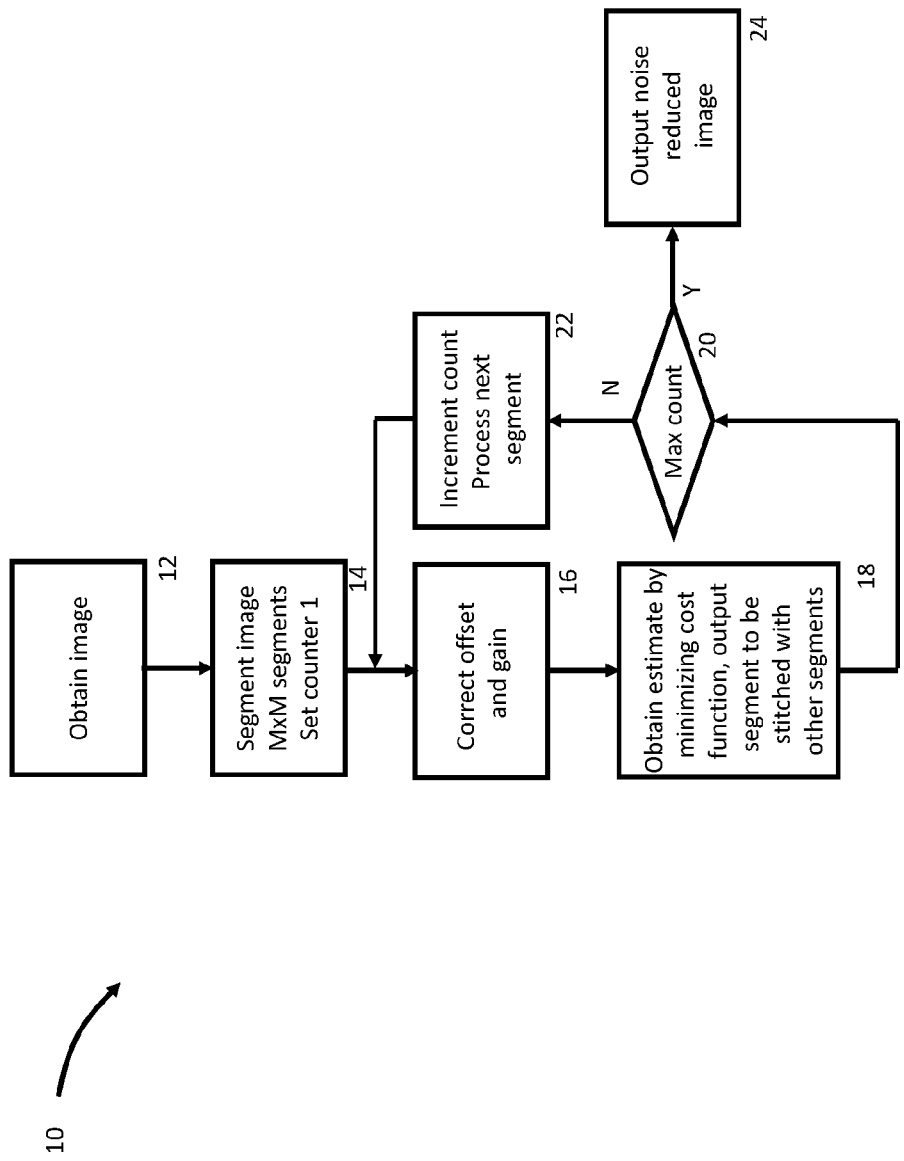
Figure 4C:
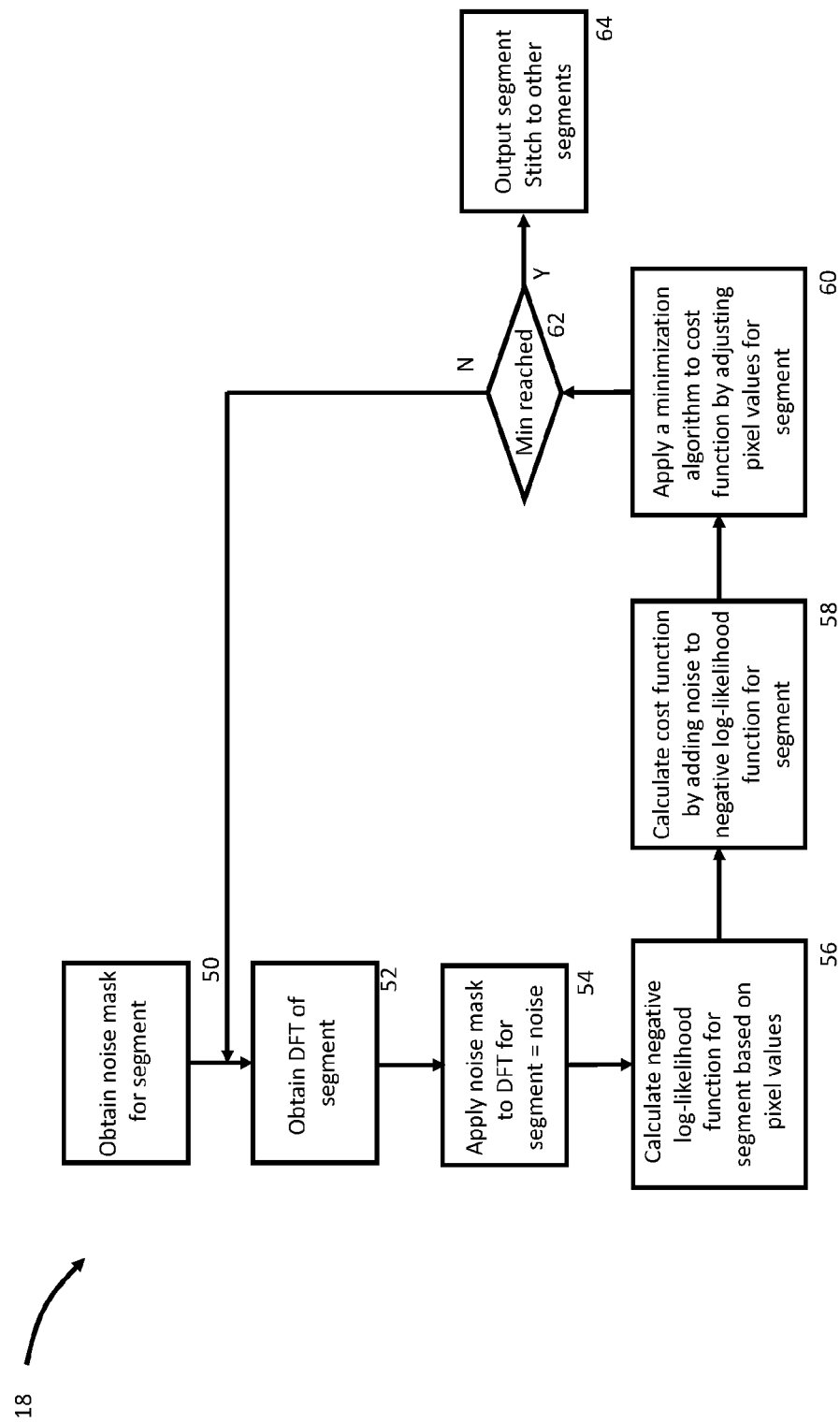

With reference to FIGS. 4A and 4B, a schematic and a flowchart, respectively, is shown providing the steps of noise reduction algorithm (typical referred to as NCS in the present disclosure) according to the present disclosure. In general, the algorithm of the present disclosure performs the following functions:

1) Correct offset and gain using pre-characterized values (some CMOS camera manufacturers now provide these parameter maps) for each pixel to obtain a pre-corrected image D. In doing so, the algorithm assigns all pixels with non-positive values in D to a small but non-zero value such as $10^{-6}$.

2) Segment input image into sub-images with M by M pixels. M can be any positive integer. According to one embodiment, the value for M is between about 1 to about 256.

3) Obtain an estimate by minimizing a cost function $f$ provided below:

$$f = LLS + \alpha \sigma N,$$

where LLS represents the simplified negative log-likelihood, and

σN represents the noise contribution near and outside the OTF periphery, respectively, and α is an empirical weight factor which can have a value that can be changed based on M and desired noise correction strength. One can use a generic quasi-Newton routine to minimize f. The initial values of the estimates are set to the values of the segments from.

4) For each segment, repeat step 3. All segments are independent and therefore can be processed in parallel through a graphics processing unit (GPU), central processing unit (CPU), or an application specific integrated circuit (ASIC). Typically, the regression converges within about 20 iterations.

Each of these steps are now described in fuller detail.

1) Pre-Correction

Pixel-dependent gain and offset maps can be either characterized in the lab or obtained from the manufacturer depending on the sensor type and their in-factory calibration process. By having these maps, the number of calculations within the iterative process described above are reduced. It should be appreciated that for simplicity a single gain map and a variance map are associated with an sCMOS array.

This concept can be extended to sensors with multiple amplifiers (e.g. column amplifier). An image A obtained from an sCMOS camera contains N number of pixels. The pixel dependent camera offset and gain are denoted as o and g, where $o_i$ and $g_i$ indicate the specific value for pixel i. A parameter $D_i$ of pixel i is calculated based on the formula below:

$$D_i = \frac{A_i - o_i}{g_i}$$

The resulting image D is subsequently used in the iterative process described as described below.

2) Noise Reduction of an Image

A diffraction limited imaging system has a fundamental cutoff frequency above which higher frequency signals cannot be collected. The cutoff frequency is defined by the numerical aperture (NA), and the detection wavelength (λ), of the imaging system. This cutoff frequency is used to extract the noise part of the image. In the 2D Fourier transform of a microscopy image, the signal from the diffraction limited system is only contained in a circular region defined by the optical transfer function (OTF) of the imaging system. The OTF is the autocorrelation of the pupil function of the imaging system. For an ideal imaging system, the pupil radius is NA/λ, and the OTF radius is therefore two times of this quantity, 2NA/λ. Given an image μ with L by L (L being an even positive integer) pixels, its 2D discrete Fourier transform is calculated from $$\hat{\mu}(k_x, k_y) = \frac{1}{L} \sum_{\substack{m=-L/2 \\ n=-L/2}}^{L/2-1} \mu(x, y) e^{-i2\pi k_x x} e^{-i2\pi k_y y},$$

where $\hat{\mu}$ is the discrete Fourier transform of the 2D image, x=mΔx, y=nΔy, kx=p/LΔx, ky=q/LΔy, m, n, p, q are incremented by 1, and p, q∈[−L/2, L/2−1], Δx and Δy represent the pixel size of the image in two dimensions and generally Δx=Δy. An OTF mask image (kx, ky) is generated from a raised cosine filter as discussed below and the noise contribution in $\hat{\mu}$ can then be calculated from $$\sigma_N = \sum_{k_x, k_y} |\hat{\mu}(k_x, k_y) M(k_x, k_y)|^2$$

3) Raised Cosine Filter Implementation on OTF Mask

A high-pass raised-cosine filter is used to generate the OTF mask for the calculation of the noise contribution in the noise correction (NCS) algorithm. The raised-cosine filter enables the user to adjust the sharpness of the mask boundary and the degree of filtering ability. The OTF mask is generated from $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$. Two types of OTF masks are considered. A first mask is referred to as OTF-weighted mask, where β=1 and T=λ/5.6NA. The other one is referred to as the noise-only mask, where β=0.2 and T=(1−β)/4NA. The OTF-weighted mask gives the best performance in regard to noise correction. However, it sacrifices a small amount of signal information), which results in a slight decrease in resolution (about 2-5 nm decrease)—see FIGS. 7A-7D discussed below, while for the noise-only mask, the signal part is left untouched, but the noise correction efficiency is also reduced. In accordance with one embodiment, the OTF-weighted mask based on a theoretical cutoff frequency is used as the OTF mask. The system according to the present disclosure allows user to choose from two premade OTF masks mentioned above and another two types of adjustable OTF mask defined by the user (adjustable OTF mask and user defined OTF Mask, further discussed below).

Figure 5A:
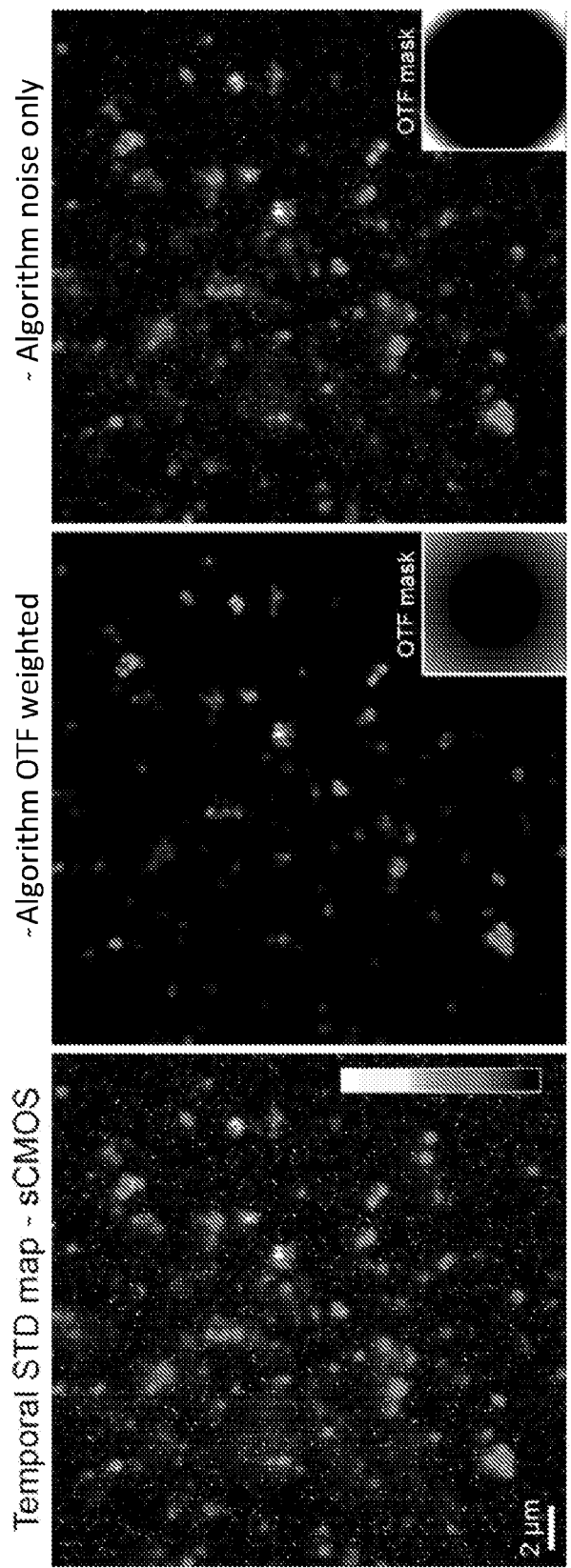
FIGS. 5A, 5B, and 5C are collectively data associated with two types of OTF masks.
Figure 5B:
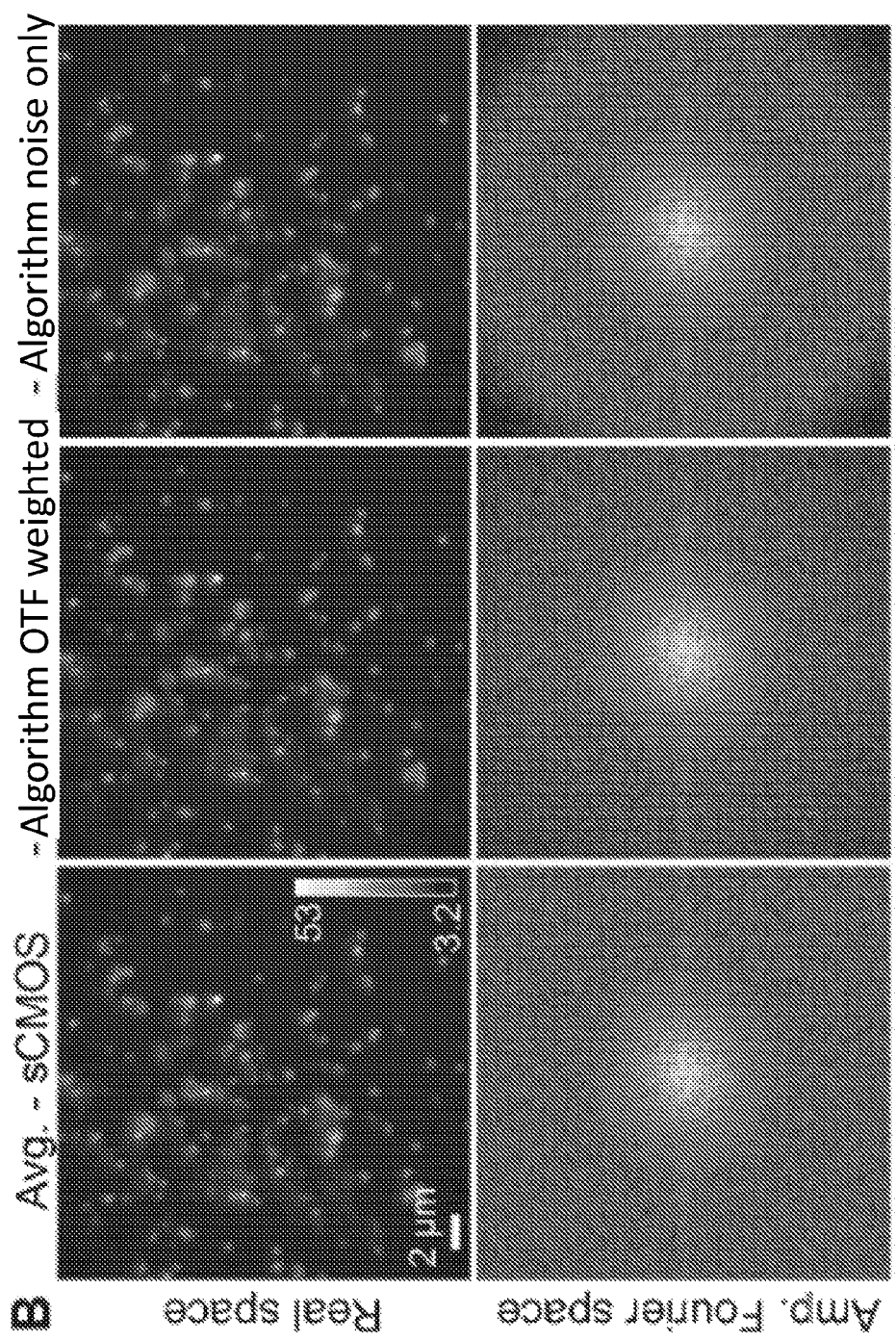
Figure 5C:
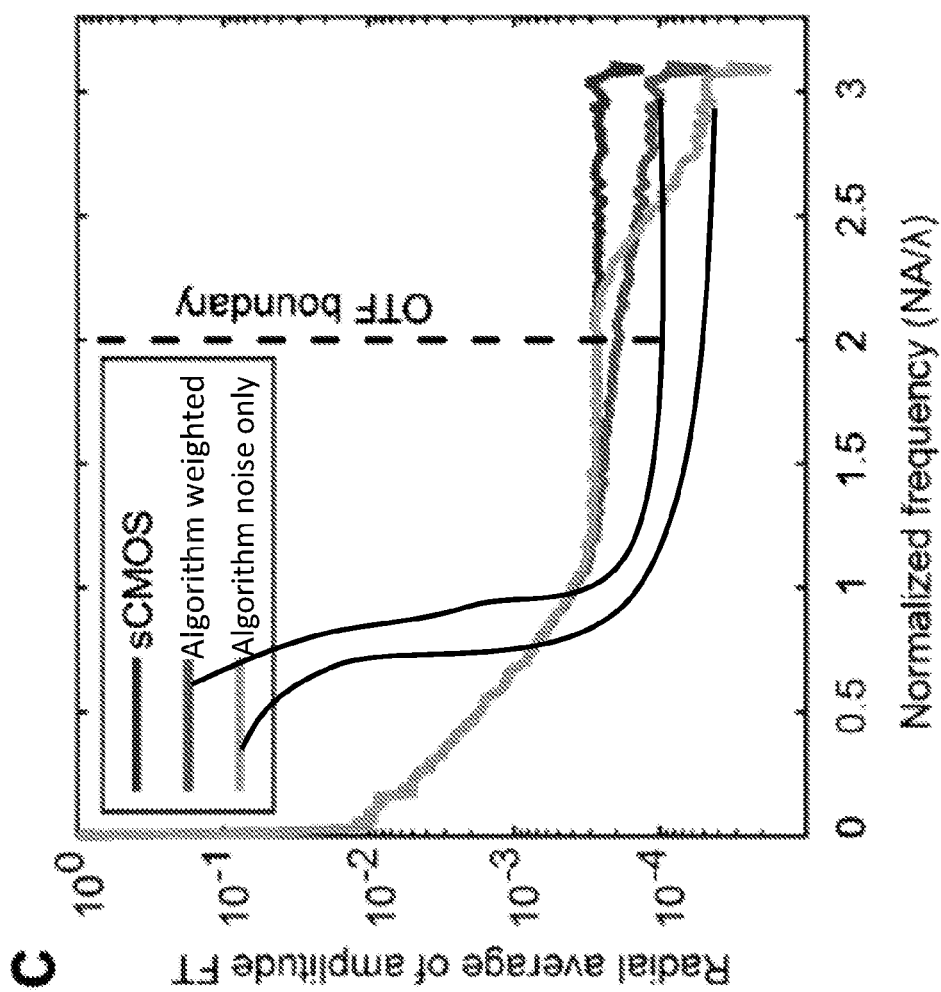

Referring to FIGS. 5A, 5B, and 5C, data associated with these two types of OTF masks are provided. In particular, referring to FIG. 5A, peroxisome membrane proteins in COS-7 cells tagged with tdEos were imaged on a conventional wide-field fluorescence microscope. FIG. 5A shows a temporal standard deviation map over 400 sCMOS frames, NCS frames with OTF weighted mask and noise only mask (left panel, center panel, and right panel, respectively). The scale is from min (STD of 2.3, dark) to max (STD of 12.3, white) in units of effective photon count. Referring to FIG. 5B, average of a sequence of sCMOS and NCS frames as in FIG. 5A and their corresponding amplitudes in Fourier space are provided. Average images were used to cancel pixel dependent noise for fair comparison of sCMOS and NCS frames, again for sCMOS frames, NCS frames with OTF weighted mask and noise only mask (left panel, center panel, and right panel, respectively). FIG. 5C provides a graph of radial average of amplitude vs. normalized frequency in Fourier space from the sCMOS and NCS frames (NCS frames with OTF weighted mask and noise only mask).

Figure 6A:
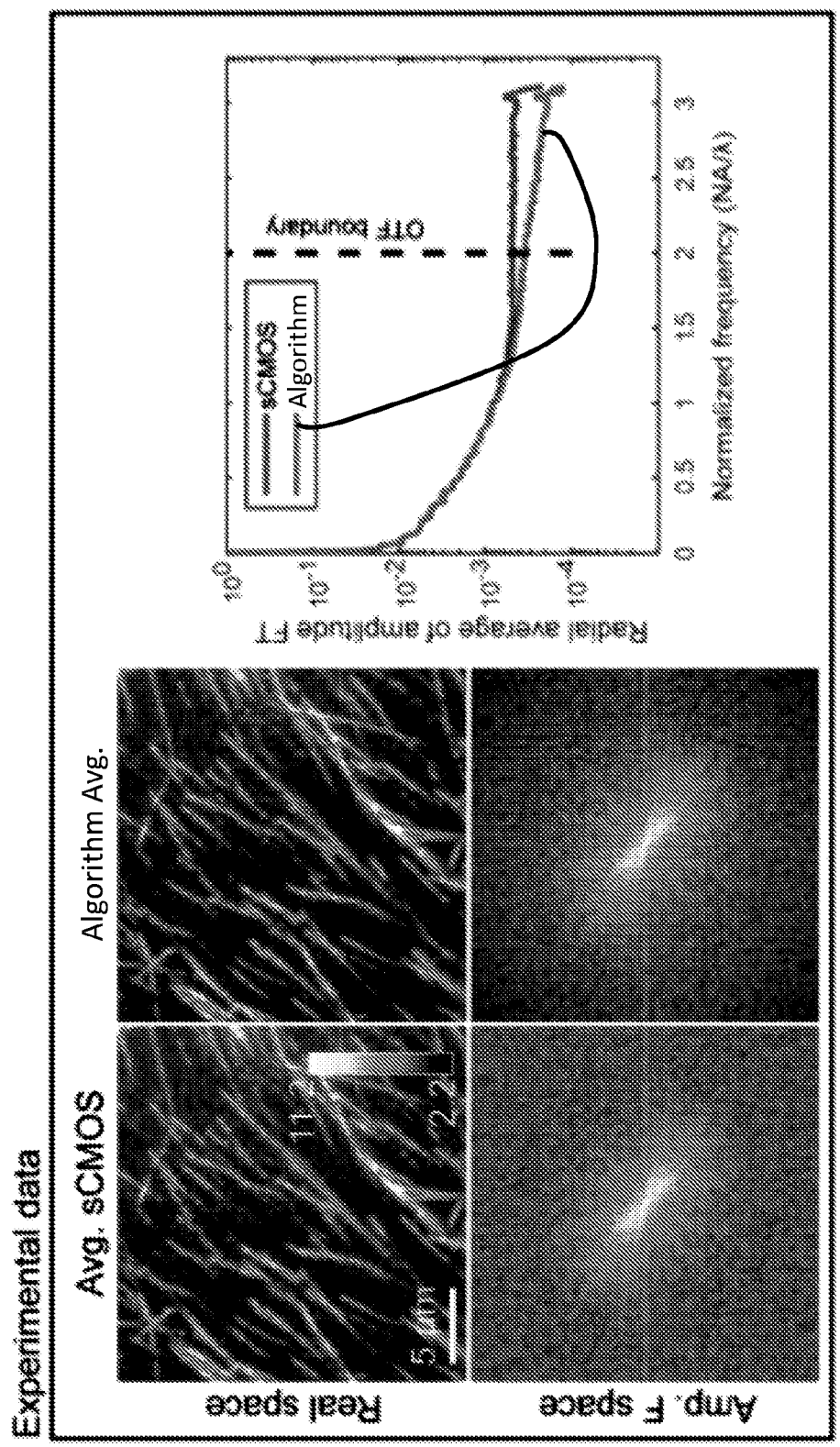
FIGS. 6A and 6B represent data associated with comparison of both experimental and simulated data in Fourier space.
Figure 6B:
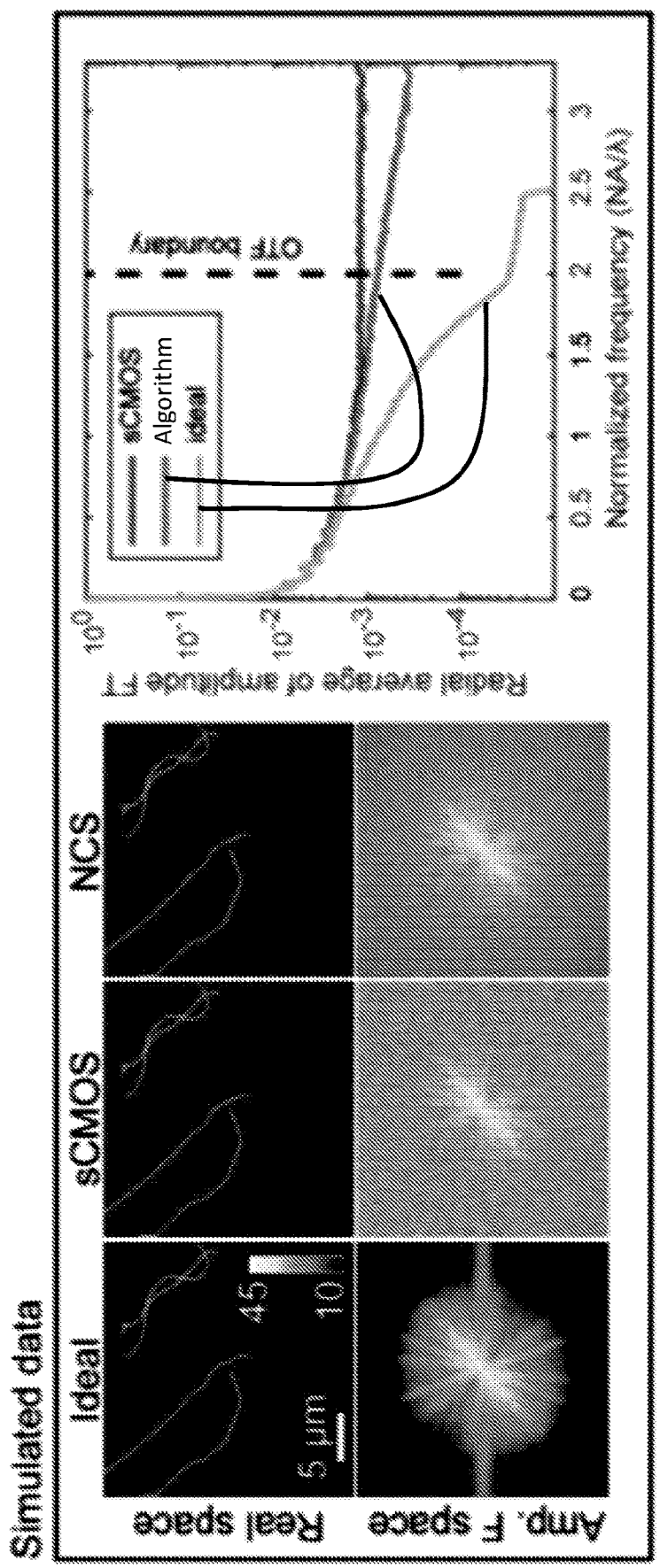

Referring to FIGS. 6A and 6B, comparison of both experimental and simulated data in Fourier space are provided. Averaged experimental image over 400 frames were used to cancel the pixel-dependent noise in order to provide a clear view of its Fourier space amplitude. Referring to FIG. 6A, comparison of sCMOS frames and NCS frames of conventional fluorescence images of EB3-tdEos in COS-7 cells are provided. The real space image was obtained by averaging over 400 sCMOS frames and the images in Fourier space are the amplitude part of the Fourier transform of the real space images. For NCS frames, the radial average of the Fourier space amplitude shows significant decrease after the OTF cutoff frequency (2NA/λ). We used the averaged image to cancel out sCMOS noise per pixel in order to facilitate clear visualization of the Fourier space image. Referring to FIG. 6B, comparisons of ideal, sCMOS frames and NCS frames of simulated microtubule images are provided. The real space images are a single frame of the simulated data including ideal case (no noise), sCMOS frame, and noise corrected image while the bottom row shows their amplitudes in Fourier space. The amplitude of the Fourier space image after NCS drops at outer radius with its value remaining higher over the entire frequency range in comparison with the ideal image. The bar indicates the effective photon count.

Figure 7A:
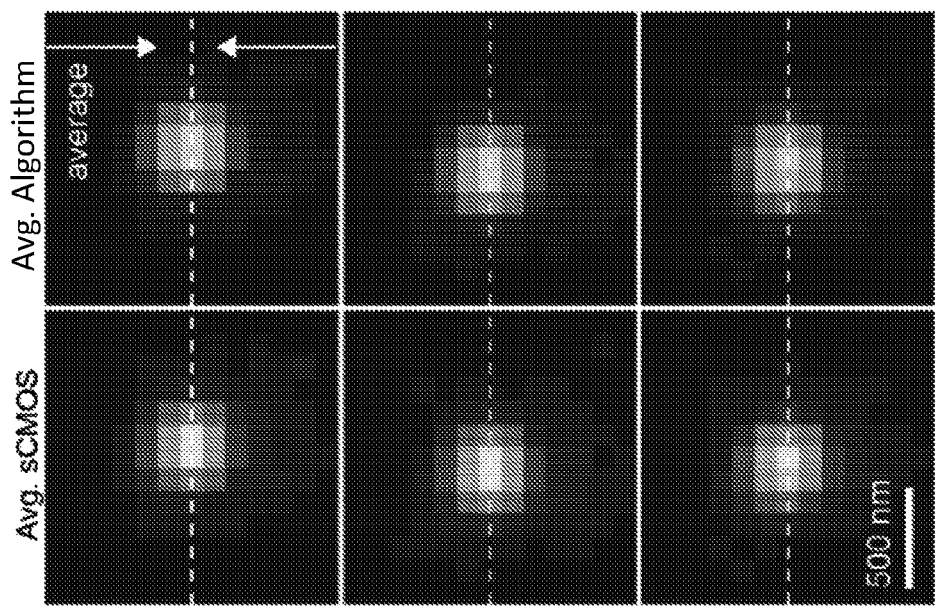
FIGS. 7A, 7B, 7C and 7D are data associated with resolution comparisons using both experimental and simulated data.
Figure 7B:
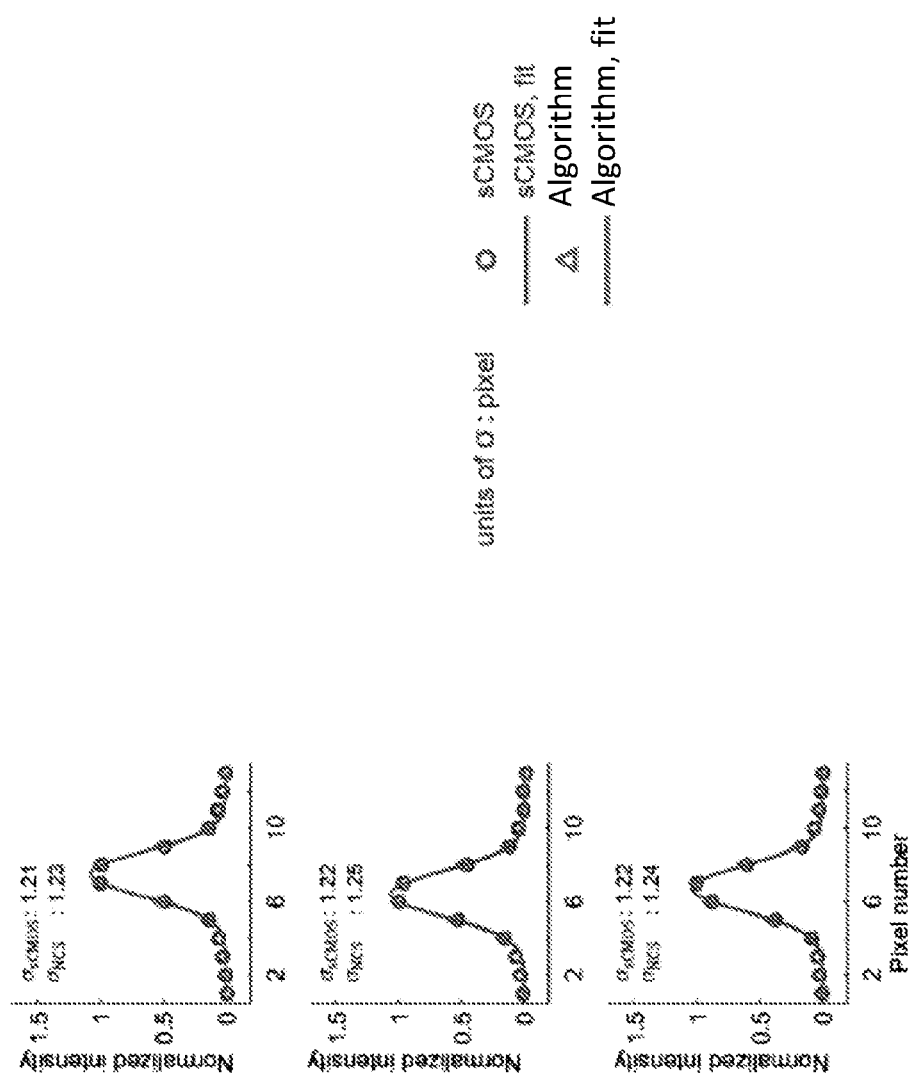
Figure 7C:
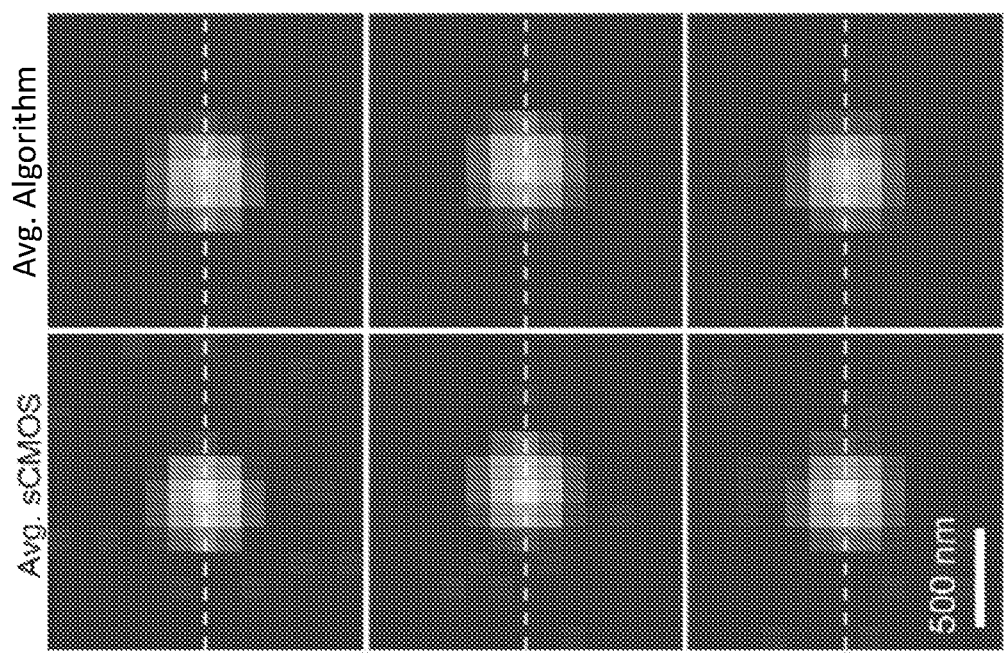
Figure 7D:
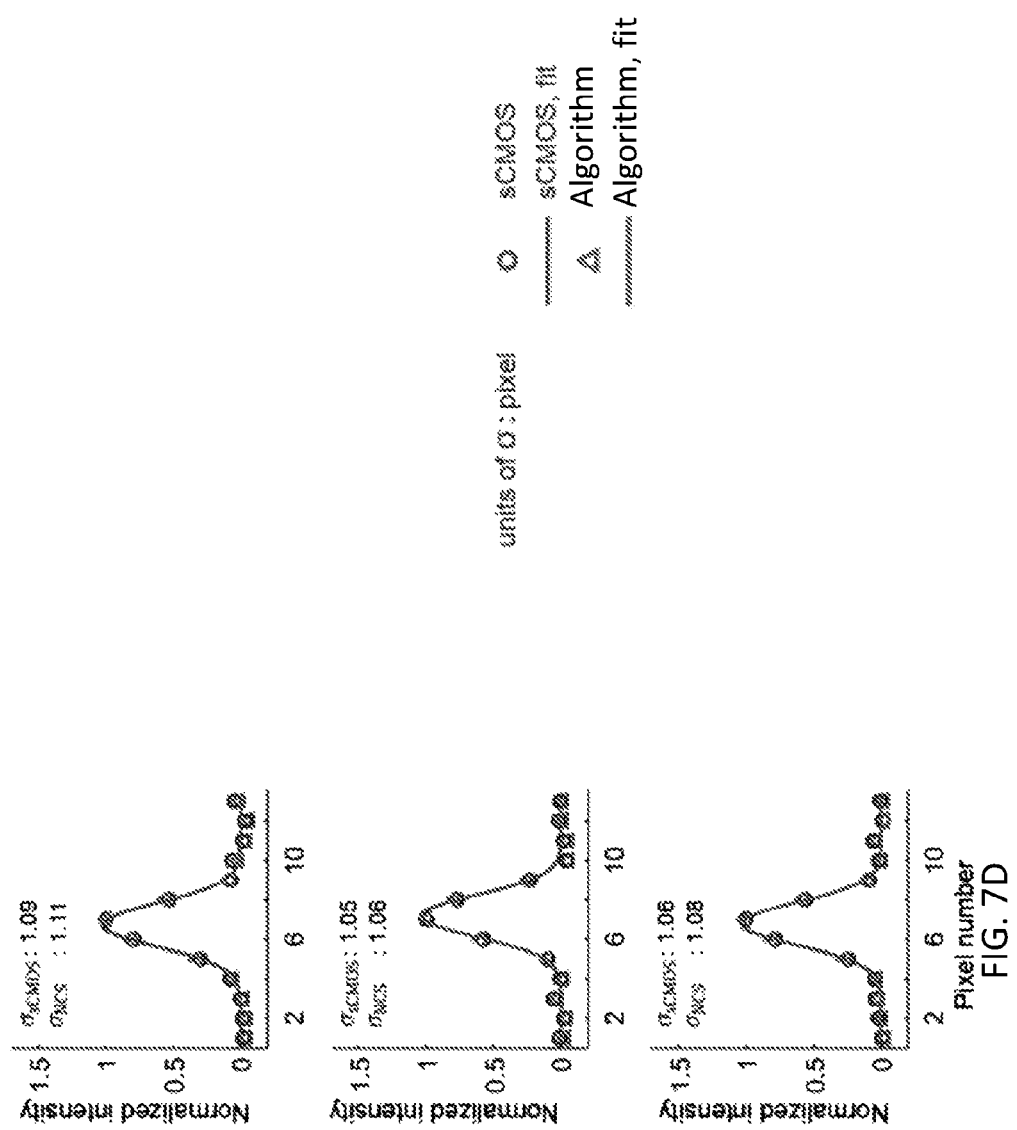

Referring to FIGS. 7A, 7B, 7C and 7D, data associated with resolution comparisons using both experimental and simulated data are shown. In particular, referring to FIG. 7A, experimental data associated with 100 nm yellow-green fluorescent bead images from sCMOS camera and NCS corrected images are provided. To cancel readout noise in sCMOS frames for a fair comparison between the sCMOS frames and NCS frames, images were averaged over 200 frames for both cases. The intensity profiles were generated by averaging over the vertical dimension of each bead image and fitted with a Gaussian function to extract their widths, $\sigma_{sCMOS}$ and $\sigma_{NCS}$ as shown in the normalized intensity vs. pixel number graphs provided in FIG. 7B. Referring to FIG. 7C, simulated data associated simulation parameters discussed below are provided. Simulated bead images based on the parameters discussed below. The simulated bead images were averaged over 20 frames from sCMOS and NCS frames. From both experimental data and simulated data, the σNCS is slightly larger than σsCMOS, resulting in 5.5 nm and 4 nm decrease in resolution, a small decrease is potentially negligible compared with the diffraction limit of approximately 250 nm.

In the simulated data, we use the worm-like chain (WLC) model to simulate microtubules, the WLC model produces a set of x, y coordinates. Based on those coordinates, we generate a binary image, where the pixel value will be set to 1 if one or more points locate within that pixel, and otherwise, the pixel value is set to zero. The binary image has a much finer pixel size, usually 8 times smaller than the output image pixel size (100 nm). Then the image is convolved with a PSF image, generated based on the parameters: NA=1.4, λ=700 nm, with the pixel size being 12.5 nm. The PSF image is normalized so that the sum of all pixel values is equal to 1. The resulting image is a diffraction limited microtubule image with a pixel size of 12.5 nm. Subsequently, the image is binned by κ to generate the image with a pixel size of 100 nm, denoted as $S_{norm}$. Given an intensity, I=100, and background, $b_g$=10, an ideal image from a diffraction limited system is generated from:

$$S_{ideal} = S_{norm} \cdot I + bg.$$

Figures 8A, 8B, 8C, 8D, 8E, 8F:
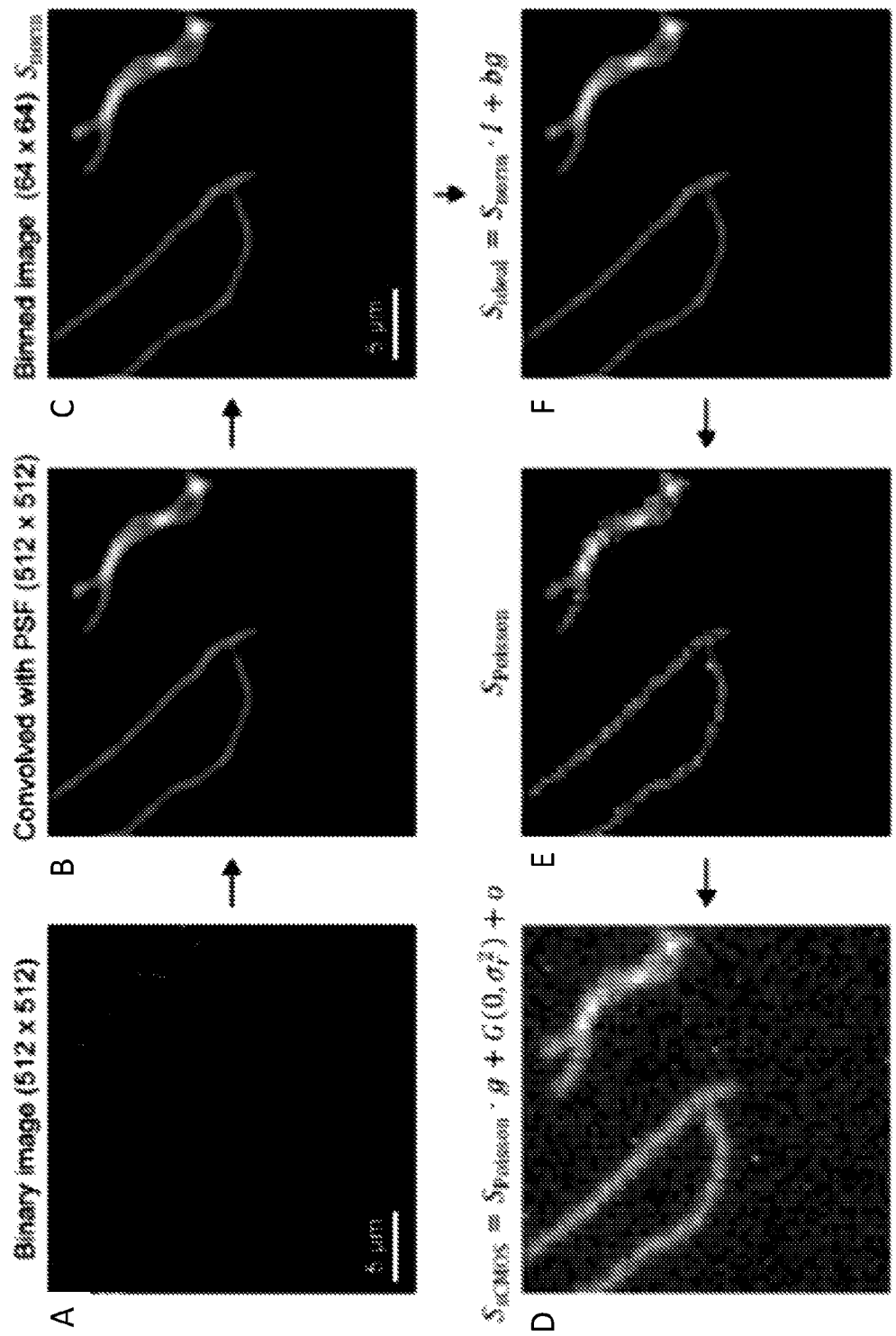
FIGS. 8A, 8B, 8C, 8D, 8E, and 8F are illustrations of data simulation procedure. To simulate a sCMOS frame of microtubules with 64 by 64 pixels, a binary (512×512) image 8A is generated from the coordinates simulated using worm-like chain model where the pixel size of the binary image is 8 times smaller than the given pixel size. The binary image is subsequently convolved with a normalized PSF, as shown in FIG. 8B, and then binned by κ to generate a 64 by 64 image, denoted as $S_{norm}$, as shown in FIG. 8C. The Snorm image is multiplied by a given intensity I and added by a given background bg to generate the ideal image, Sideal, as shown in FIG. 8D. The ideal image is then corrupted with Poisson noise to form SPoisson, as shown in FIG. 8E. The SPoisson image is then multiplied by a sCMOS gain map g, and added by a Gaussian noise in each pixel, $G(0, \sigma r^2)$, where each pixel is a random value drawn from a Gaussian distribution with a mean equal to zero and variance equal to $\sigma r^2$, where $\sigma_r^2$ is different in each pixel. An offset map o is then added, as shown in FIG. 8F.

Then the image is corrupted with Poisson noise, denoted as SPoisson. Given a gain map, g, variance map, σr², and offset map, o, the final image of the sCMOS camera is generated from $$S_{sCMOS} = S_{Poisson} \cdot g + G(0, \sigma_r^2) + o,$$

where G(0, $\sigma_r^2$) generates an image of random variables from Gaussian distributions with means equal to zero and variances equal to corresponding values in σr². Referring to FIGS. 8A, 8B, 8C, 8D, 8E, and 8F, illustrations of data simulation procedure are provided. To simulate a sCMOS frame of microtubules with 64 by 64 pixels, a binary (512×512) image 8A is generated from the coordinates simulated using worm-like chain model where the pixel size of the binary image is 8 times smaller than the given pixel size. The binary image is subsequently convolved with a normalized PSF, as shown in FIG. 8B, and then binned by 8 to generate a 64 by 64 image, denoted as $S_{norm}$, as shown in FIG. 8C. The $S_{norm}$ image is multiplied by a given intensity I and added by a given background $b_g$ to generate the ideal image, $S_{ideal}$, as shown in FIG. 8D. The ideal image is then corrupted with Poisson noise to form $S_{Poisson}$, as shown in FIG. 8E. The $S_{Poisson}$ image is then multiplied by a sCMOS gain map g, and added by a Gaussian noise in each pixel, $G(0, \sigma r^2)$, where each pixel is a random value drawn from a Gaussian distribution with a mean equal to zero and variance equal to $\sigma r^2$, where $\sigma r^2$ is different in each pixel. An offset map o is then added, as shown in FIG. 8F. The resulting image is a simulated sCMOS frame, denoted as $S_{sCMOS}$.

Figures 11A, 11B, 11C, 11D:
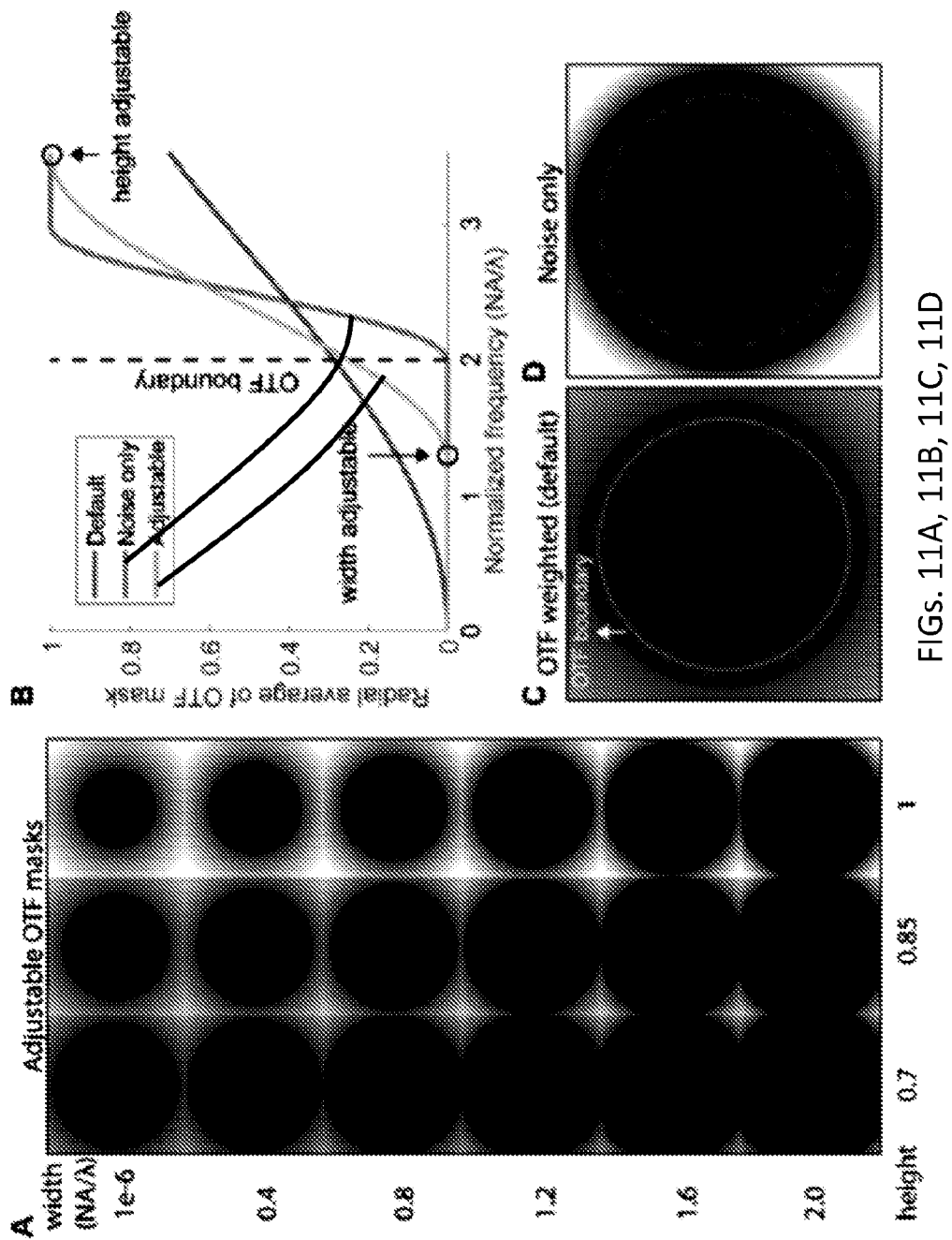
FIG. 11A shows various adjustable OTF masks with the width from $10^{-6}$ to 2, unit in NA/λ, and height from 0.7 to 1.
FIG. 11B is a graph of radial average of OTF mask vs. normalized frequency showing the radial average plot of the different choices of the OTF masks.
FIG. 11C shows an OTF weighted mask which has a width equal to zero, and the height is dependent on the sampling rate of the detector.
FIG. 11D is a noise-only OTF mask which has a width equal to 2 (unit in NA/λ), and the height is also dependent on the sampling rate of the detector.

While a theoretical cutoff frequency to extract the noise part of the image can be used—this cutoff value is derived based on an ideal imaging system, for a real imaging system, due to the system and sample induced aberrations, the effective cutoff frequency may become smaller than 2NA/λ. Therefore, the algorithm of the present disclosure allows the user to choose from the following options: OTF-weighted mask (default), noise-only OTF mask, adjustable OTF mask and user defined OTF mask. The adjustable OTF mask is based on $$\beta = \frac{\frac{\pi}{2}\left(\frac{k_{max}}{w_0} - 1\right)}{acos(1-2h) + \frac{\pi}{2}\left(\frac{k_{max}}{w_0} - 1\right)},$$

$$T = \frac{1-\beta}{2w_0},$$

$$k_{max} = \frac{\sqrt{2}}{2 pixelsize}, \quad w_0 = \frac{wNA}{\lambda},$$

where, the width w can be adjusted from $10^{-6}$ to 2 and the height h can be adjusted from 0 to 1. The adjustable OTF mask requires two user inputs: the width, w, and the height, h. These two user inputs are demonstrated in reference to FIGS. 11A, 11B, 11C and 11D. In particular, referring to FIG. 11A, various adjustable OTF masks with the width from $10^{-6}$ to 2, unit in NA/λ, and height from 0.7 to 1. The width must be greater than zero. Referring to FIG. 11B, a graph of radial average of OTF mask vs. normalized frequency is provided showing the radial average plot of the different choices of the OTF masks. Referring to FIG. 11C, an OTF weighted mask is shown which has a width equal to zero, and the height is dependent on the sampling rate of the detector. A comparison of NCS results at various sampling rates of the detector is provided in FIGS. 12A-12C, discussed below. It is the default and recommended option of the OTF masks. Referring to FIG. 11D, a noise-only OTF mask is shown which has a width equal to 2 (unit in NA/λ), and the height is also dependent on the sampling rate of the detector.

Figures 12A, 12B:
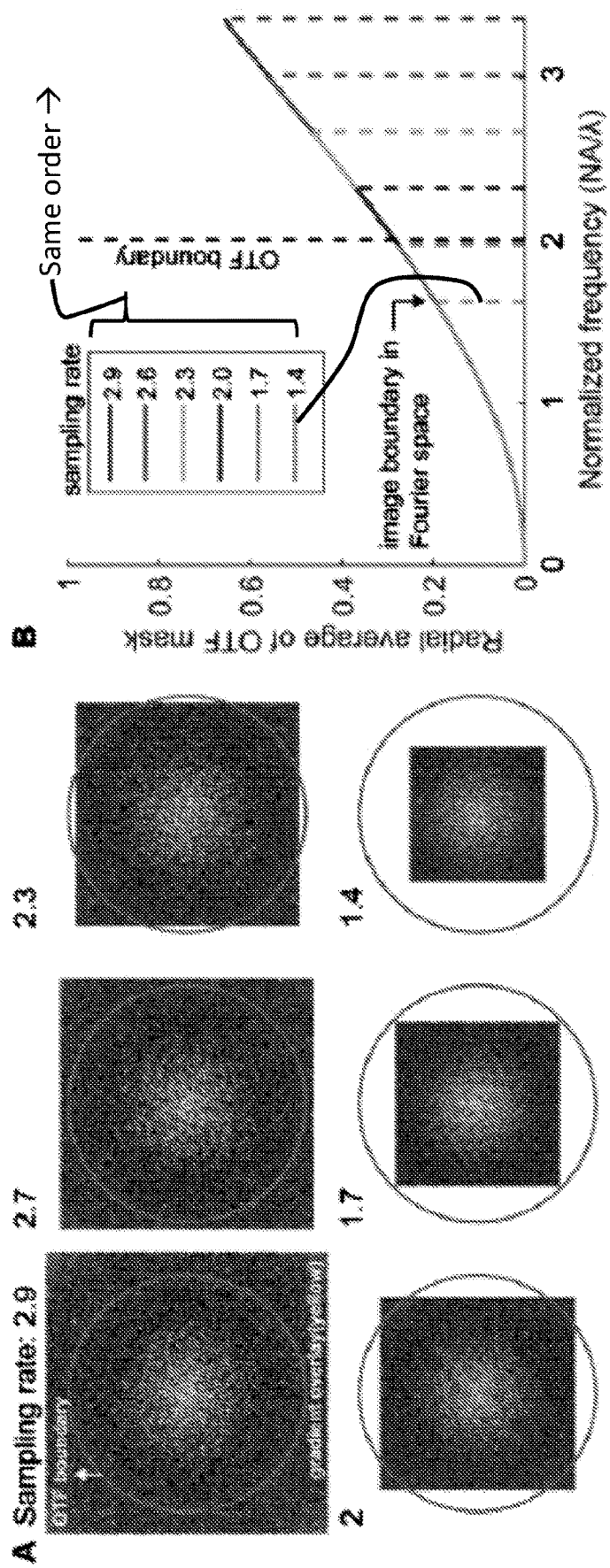
FIGS. 12A, 12B, and 12C represent a comparison of NCS results at various sampling rates of the detector, according to the present disclosure.
Figure 12C:
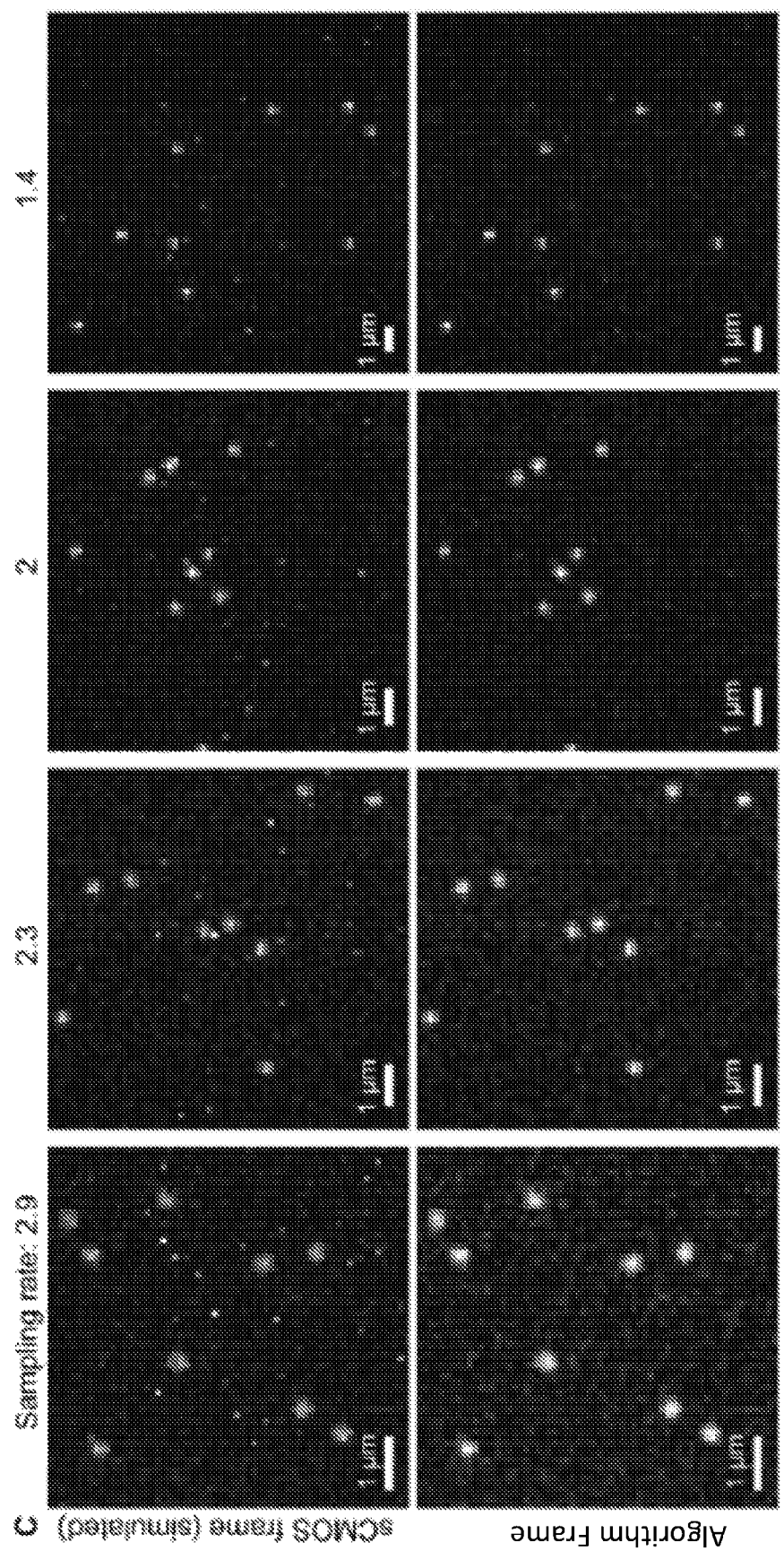
Figure 13:
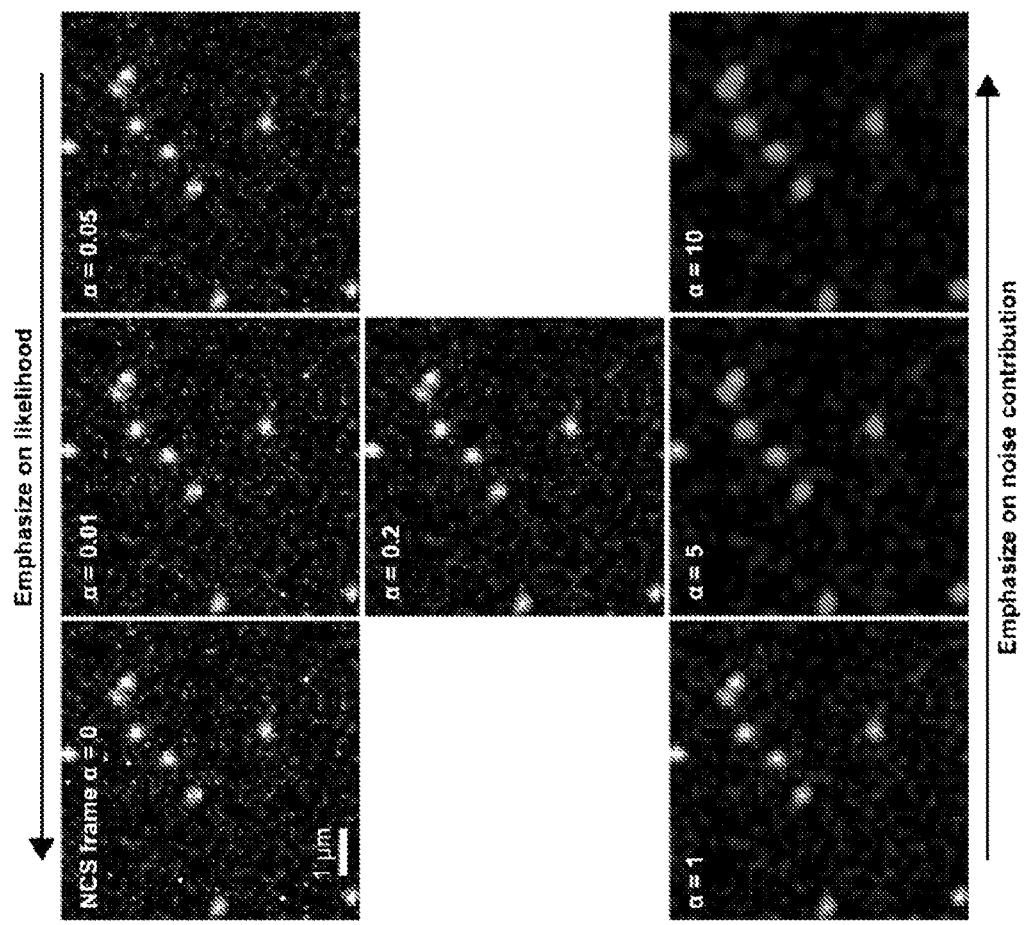
FIG. 13 is a set of images showing a comparison of the NCS results at various α values.
Figures 14A, 14B:
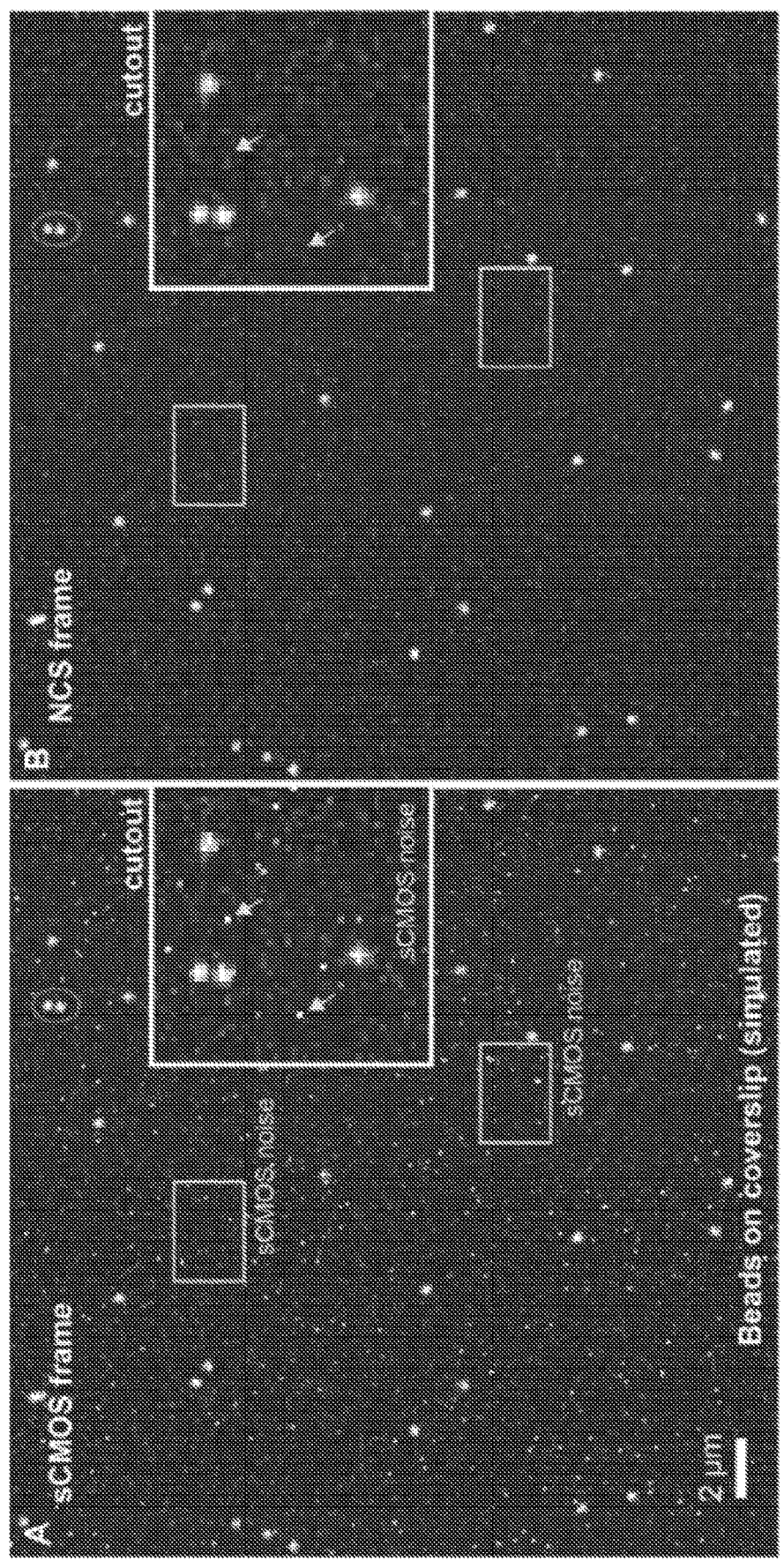
FIGS. 14A, 14B, 14C, and 14D show data associated with lowpass filter as compared to noise reduction based on the algorithm of the present disclosure based on a comparison of an sCMOS frame, an NCS frame, the sCMOS frame blurred by a 2D Gaussian kernel with a sigma equal to 1 pixel, and the sCMOS frame after a low pass filter with a cutoff frequency equal to the OTF radius, respectively.
Figures 14C, 14D:
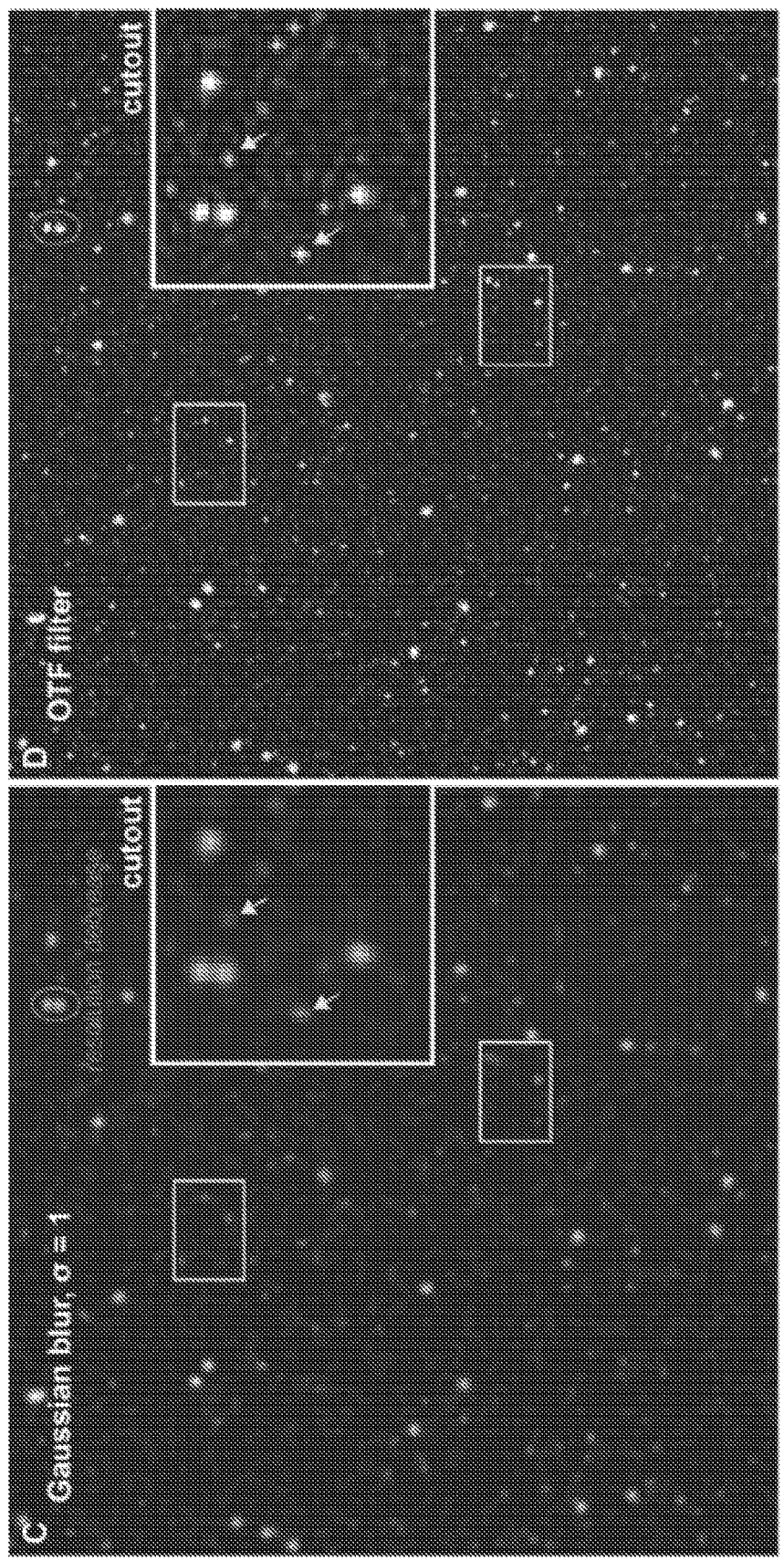

Based on the Nyquist sampling rate, the pixel size of the image is often selected to be no more than half of the system resolution. The system resolution can be characterized by the Rayleigh criterion, 0.61λ/NA, known to a person having ordinary skill in the art. We define the sampling rate of the detector to be the Rayleigh criterion divided by the pixel size of the image (e.g. 2 is the minimum Nyquist sampling rate). We investigated the performance of the NCS algorithm under various sampling rates. We found that the NCS algorithm tolerates a wide range of sampling rates from 1.4 to 2.9. However, the correction power starts to gradually decrease from the sampling rate less than 2.0. This is because with a sampling rate smaller than 2.0, the OTF boundary is mostly outside the image boundary in the Fourier space (as shown in FIGS. 12A-12C), leaving fewer pixels to be considered majorly from the noise part of the image and consequently decreasing the proportion of the noise contribution in the cost function, which results in a similar effect as decreasing the α value as shown in FIG. 13. Referring to FIG. 13, a set of images showing a comparison of the NCS results at various α values is provided. In the cost function, an α factor is multiplied with the noise contribution part. If α=0, the cost function is already at the minimum, so that the NCS algorithm has no effect on the original image and the resulting NCS frame is the same as the sCMOS frame. As the α value increases, so does the noise correction power. However, if the α value is too large, the NCS algorithm will over-emphasize on the noise contribution, which will result in a decrease in resolution. A can range from $10^{-6}$ to $10^6$. With a significant low-sampling rate such as 1.4 (as shown in FIGS. 12A-12C), the height of the OTF-weighted mask is decreased to ~0.2, which will greatly limit the optimization potential in the NCS algorithm. Furthermore, for a sampling rate less than 1.73, there are no pixels outside the OTF boundary, and in this case, we recommend using the OTF-weighted mask rather than the noise-only mask as the latter will give a zero noise contribution making the cost function unminimizable. Overall, we recommend a sampling rate greater than 2 for an efficient noise correction.

As mentioned above, referring to FIGS. 12A, 12B, and 12C, a comparison of NCS results at various sampling rates of the detector is provided. The sampling rate of the detector is defined to be the Rayleigh criterion divided by the pixel size of the image (e.g. 2 is the smallest Nyquist rate) and the Rayleigh criterion is 0.61λ/NA. In particular, in FIG. 12A, the amplitude in Fourier space of the simulated beads imaged at various sampling rates is shown. The OTF radius is a constant, equal to 2NA/λ (red circle). The number of pixels with higher weight in the OTF-weighted mask (the gradient overlay) decreases with the sampling rate. In FIG. 12B, radial average plot of the OTF mask at various sampling rates is provided. As the sampling rate decreases, the OTF mask is truncated more to the center. In FIG. 12C, the sCMOS frame and its corresponding NCS frame at various sampling rates is shown. FIG. 12C shows that the NCS algorithm performs well up to the sampling rate at 2 and gradually decreases after 2.

Those two user inputs (the radius, w, and the height, h) change the shape of the OTF mask. For advanced users, the option of a user defined OTF mask provides additional flexibility and will further enhance the correction performance on aberrated systems with a user generated OTF mask.

For the algorithm of the present disclosure, rather than the complete OTF function, the algorithm only requires an estimation of the effective cutoff frequency (OTF boundary). A method on how to estimate the OTF boundary is provided below. Starting with a high signal to noise image of sparsely distributed beads, this cutoff frequency can be estimated by the following steps:

(1) Calculate the average image of a static image sequence from the sCMOS camera;
(2) Calculate the modulus of its Fourier transform (absolute value of the complex Fourier coefficient);
(3) Calculate the radial average of the logarithm of the resulting image from (2);
(4) Use a shrinking window to smooth the radial average curve (e.g. calculate the standard deviation within the window) and find the cutoff frequency from the turning point of the smoothed curve.

To obtain an accurate estimation of the OTF boundary for aberrated systems, according to one embodiment, one can image the fluorescence bead at focus, with a diameter of about 40 nm to about 100 nm, and a spectrum matching the emission spectrum of the biological sample of interest with a density of 1-3 beads per µm².

For an optimized microscope system that is diffraction limited, according to one aspect of the present disclosure, as described above, the OTF weighted mask with an increasing gradient from the center to the edge can be used. A comparison between the OTF-weighted mask and the noise-only mask is described above, with respect to FIGS. 5A-5C. An inspection of these figures, it can be seen that the OTF-weighted mask corrects noise more effectively while maintaining the image resolution, as discussed above.

(4) Negative Log-Likelihood of the Image

As mentioned above, the pixel readout (unit: ADU) from a single pixel on an sCMOS camera is modeled as a sum of two random variables following Poisson and Gaussian distributions respectively. Therefore, the probability of the pixel readout can be described as a convolution of a Poisson distribution and a Gaussian distribution. To reduce the computation complexity of an infinite sum required by the convolution, an analytical approximation of this probability function is applied. Therefore, the likelihood between the estimated image µ and the image D is calculated from:

$$L(\mu, \gamma \mid D, \gamma) = \prod_{i=1}^{N} \frac{e^{-(\mu_i + \gamma_i)}(\mu_i + \gamma_i)^{(D_i + \gamma_i)}}{\Gamma(D_i + \gamma_i + 1)}$$

where i is the pixel index and N is the number of pixels of the image, and γi is the calibration quantity and equals to $\sigma i^2/gi^2$, where $\sigma i^2$ and gi are the variance and the gain of pixel i on the sCMOS camera (which can be generated from single or multiple variance and gain maps.

The algorithm of the present disclosure is compatible with sensors that have multiple effective readout units per pixel (for example, dual column amplifiers in certain CMOS sensors). The algorithm allows the inputs of the gain and the variance map(s) generated either from a single map or multiple maps that takes the ADU-level dependent gain and variance into consideration. In software or hardware, an example code is provided for using multiple gain and variance maps based on the signal levels (ADU) of each pixel. The code requires the user to provide a set of N (N>1) signal levels in ADUs, with their corresponding gain and variance maps at each ADU level. For example, for dual amplifier sensors with signal levels of 0-1500 ADU and 1500-Max ADU (user defined; obtained from camera manufacturer), the code takes in two sets of corresponding gain and variance maps. For each input sCMOS frame, the code determines the proper gain and variance to use for each pixel according to its ADU count. The resulting gain and variance stacks, having the same size as the input sCMOS frame stack, will be used as the inputs of the algorithm of the present disclosure. Under the assumption of the time-independent noise behavior, the algorithm of the present disclosure will perform in the same way as using a single gain and variance map. In most situations a single gain and variance map at low photon level (e.g. <750 photons per pixel per frame) are generally applicable to studies with low light (e.g. live cell fluorescence imaging and light sheet microscopy) where the algorithm of the present disclosure is mostly effective.

The calculation of likelihood function in the algorithm of the present disclosure assumes no correlation in the pixel values between adjacent frames. In the case of such correlation, the algorithm could be adapted to incorporate this additional information by modifying the cost function. To achieve this, one would need a precise understanding of the correlation behavior of the noise and its probability density function. By extending the current single frame based operation into global optimization using multiple frames, further enhancement of the developed algorithm can be achieved.

For optimization, the negative of the log-likelihood function is used, and with Stirling's approximation the following relationship is obtained:

$$-\ln(L) \cong \sum_{i=1}^{N} [\mu_i - D_i - (D_i + \gamma_i)\ln(\mu_i + \gamma_i) + (D_i + \gamma_i)\ln(D_i + \gamma_i)]$$

Because D and γ are constant, they are omitted in the objective function. The above relationship is then reduced to:

$$LLs = \sum_{i=1}^{N} [\mu_i - (D_i + \gamma_i)\ln(\mu_i + \gamma_i)]$$

where LLs denotes the simplified negative log likelihood function. Because µ is the estimate of photo-electrons before readout, it is non-negative. Thus, to ensure $\mu_i \geq 0$ during each iteration, Di is constrained to be greater than 0, by setting pixels with non-positive values in D to $10^{-6}$. The performance of the algorithm of the present disclosure was examined by comparing the images with different types of noise and image after noise reduction with the ideal image for simulated data based on log-likelihood ratio test, where the log-likelihood ratio is obtained from:

$$LLR = -2\ln\frac{L(u \mid X)}{L(X \mid X)} = 2[u - X + X\ln(X) - X\ln(u)]$$

where u stands for the ideal image, which is noise free,
X is either the estimated image, the ideal image, the image with readout and Poisson noise, or the image with only Poisson noise.

Figures 9A, 9B, 9C:
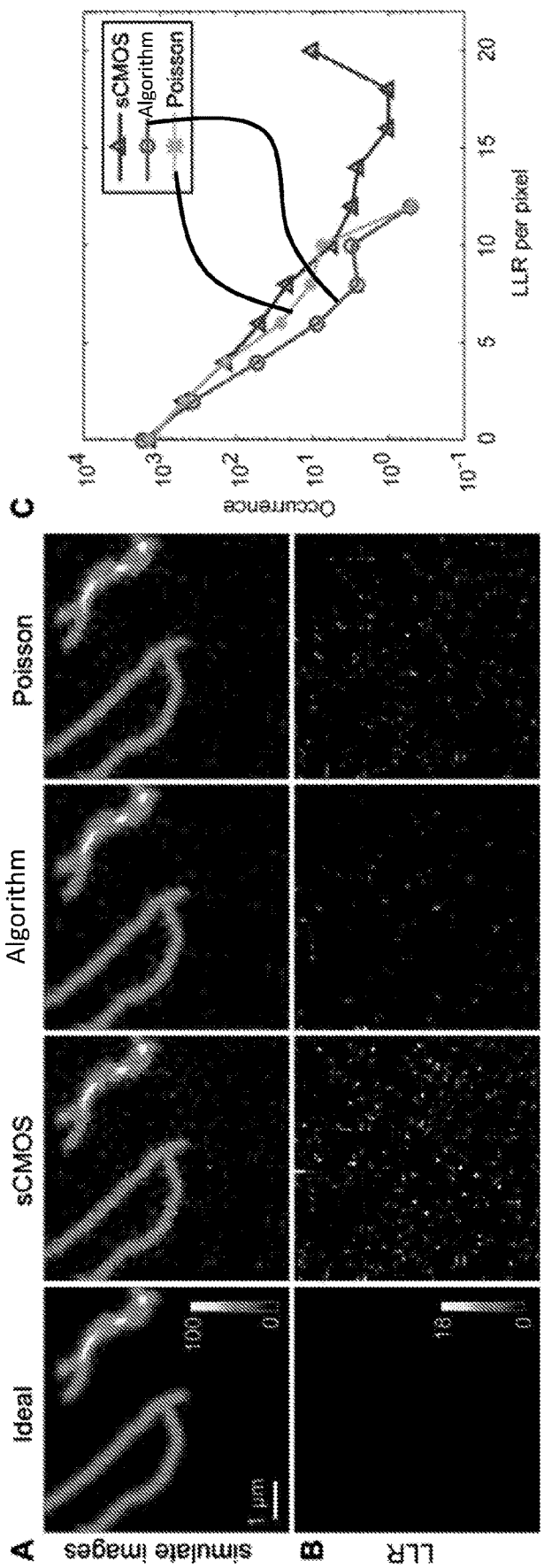
FIGS. 9A, 9B, and 9C represent log-likelihood ratio (LLR) comparison of simulated data.

Referring to FIGS. 9A, 9B, and 9C, Log-likelihood ratio (LLR) comparison of simulated data are provided. In particular, referring to FIG. 9A, simulated microtubule images under conditions of no noise (ideal), with readout and Poisson noise (sCMOS), after noise correction (NCS), and with Poisson noise only (Poisson) are shown (most left panel, left panel, right panel, and most right panel, respectively). The pixel dependent noise is effectively removed using the noise correction algorithm; the bar indicates the effective photon count. Referring to FIG. 9B, a Log-likelihood ratio map of each image of FIG. 9A is shown. For the ideal case, the LLR is zero for each pixel. The pixel LLRs are significantly reduced after noise reduction and slightly smaller than the case of Poisson due to the additional microscope information incorporated during the correction. Referring to FIG. 9C histograms of LLRs of individual pixels in FIG. 9B under the conditions of sCMOS, NCS and Poisson are provided.

The smaller the LLR value, the closer the image X is approximate to the ideal image u. The LLR (log-likelihood ratio) value are significantly reduced after noise reduction and slightly smaller than that of Poisson-noise limited image due to the additional microscope information as discussed above incorporated during the correction—See section 2: Noise Reduction of an image.

(5) Image Segmentation

In the sCMOS noise correction algorithm, the number of variables is equal to the number of pixels in the image. For an image with 256 by 256 pixels, the optimization of a total of 65536 variables is computationally intensive. To reduce the computation time, each image is segmented into small sub-images, each containing M by M pixels and therefore, these sub-images can be processed in parallel through CPU or GPU.

Figure 10:
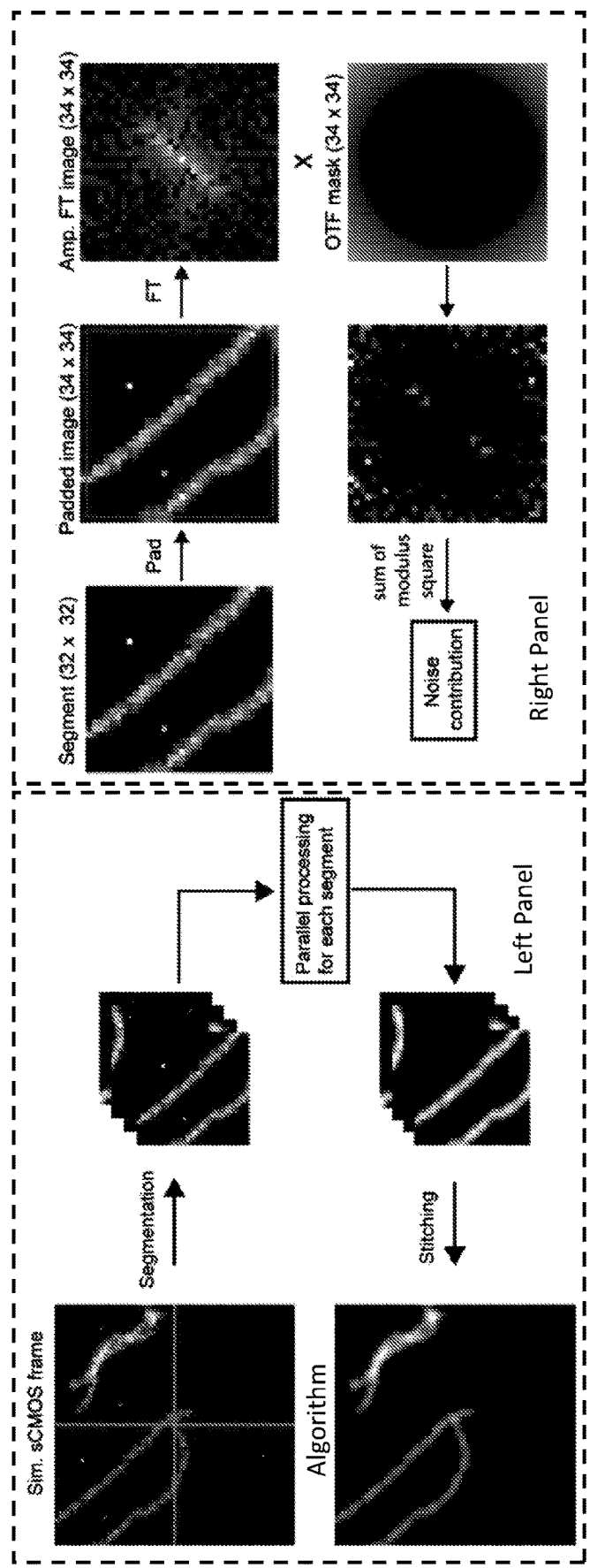
FIG. 10 shows illustrations of the segmentation scheme used in algorithm of the present disclosure.

Referring to FIG. 10, illustrations of the segmentation scheme used in algorithm of the present disclosure are provided. In the left panel, general segmentation scheme are shown. The input sCMOS frame is segmented into small sub-images and then fed into the parallelized noise correction algorithm. The processed segments are then combined together to form the entire NCS frame. In the right panel, detailed pre-processing steps are shown for each segment to avoid fast Fourier transform artifacts on image boundaries.

The segmentation size is an adjustable parameter in the algorithm of the present disclosure.

We demonstrated the differences between the NCS algorithm and the low pass filter, which is used for generic noise reduction. The low pass filters are generated by either convolving the image with a sharp 2D Gaussian or multiplying a low pass filter in the Fourier space. For the first method, we implemented a Gaussian blurring kernel with a sigma of 1 pixel, and for the second method, we used a low pass filter with a cutoff frequency equal to the OTF radius, $2NA/\lambda$. We note that both low pass filters failed to correct the sCMOS noise (see FIGS. 14A-14D, where a set of images are provided for a comparison of the NCS algorithm and a low pass filter). In order to illustrate the fundamental differences between low pass filters and the NCS algorithm, the simulated bead data uses a simulated high variance map (3000~6000 $ADU^2$. With reference to FIGS. 14A, 14B, 14C, and 14D a sCMOS frame, an NCS frame, the sCMOS frame blurred by a 2D Gaussian kernel with a sigma equal to 1 pixel, and the sCMOS frame after a low pass filter with a cutoff frequency equal to the OTF radius, respectively, are provided. The cutout region in each image is the 2× zoom of the region above the larger box. It shows that both the Gaussian blur and the OTF filter cannot effectively remove the sCMOS noise (small boxes and arrows), while the NCS algorithm can significantly reduce the sCMOS noise fluctuations. Furthermore, the Gaussian blur method also reduces the resolution of the original image (elongated circles). Rather than correcting high readout-noise pixels, the low pass filters replace the high readout-noise pixels with a blurry spot. Furthermore, by using the low pass filters, significant decreasing of the image resolution is observed (Gaussian blur) and the ringing artifacts in the filtered image (Gibbs phenomenon) also appear. In contrast, we found the NCS algorithm is able to effectively reduce the sCMOS noise while maintaining the image resolution unchanged.

The computation speed of the algorithm of the present disclosure can be significantly increased with segmentation and parallel processing. The performance of the algorithm of the present disclosure under various segmentation sizes and iteration numbers on a 6-core running at 3.4 GHz CPU was studied. Under the tested conditions (see table below), we found that the speed decreases with the increased segmentation size and as expected, with the increased iteration number. It is then preferred to use as few iterations as possible. However, lower iteration number will decrease noise correction performance especially in cases where readout variance is relatively high. According to one embodiment at least about 10 iterations is

| runtime (s) | segment size 8 × 8 | segment size 16 × 16 | segment size 32 × 32 |
| --- | --- | --- | --- |
| 5 iterations | 3.93 | 5.01 | 12.60 |
| 10 iterations | 6.41 | 8.27 | 21.74 |
| 15 iterations | 9.03 | 11.72 | 30.94 |
| 20 iterations | 11.52 | 15.14 | 40.08 | performed. According to another embodiment, the default iteration number is set to about 15.

Figures 15A, 15B:
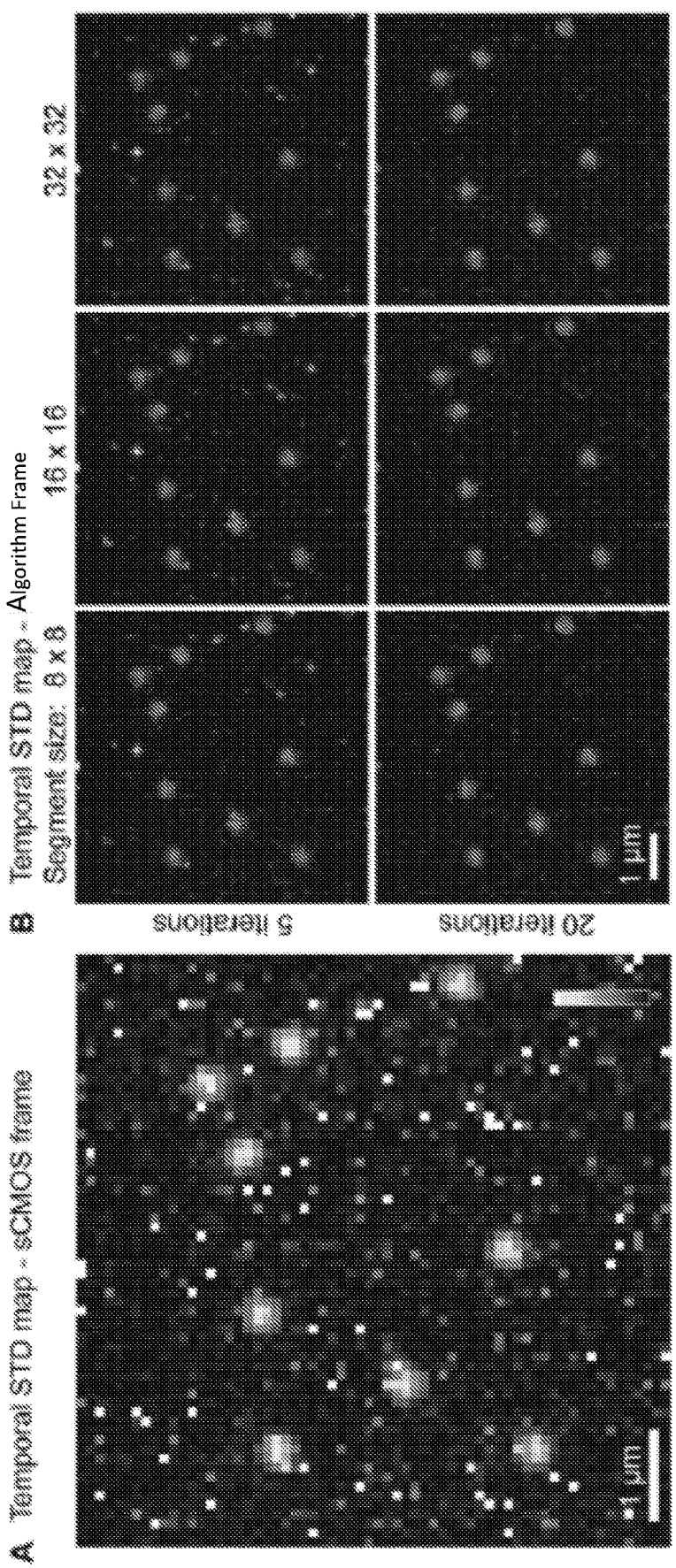
FIGS. 15A and 15B show data associated with a comparison of the NCS result with three segmentation sizes and two iteration numbers.

Referring to FIGS. 15A and 15B, a comparison of the NCS result with three segmentation sizes and two iteration numbers are provided. The simulated beads data use a simulated high variance map (3000~6000 $ADU^2$). The temporal standard deviation (STD) maps are generated from 100 sCMOS frames and NCS frames. The scale is from min (STD of 1.5, black) to max (STD of 6, white). In particular referring to FIG. 15A, a temporal STD map of 100 sCMOS frames is shown. It shows many high readout noise pixels (STD>6). With reference to FIG. 15B, a temporal STD map of 100 NCS frames is shown at various conditions. It shows that the noise correction performance slowly improves with larger segmentation size and quickly improves with the iteration number. However, most of the high readout noise pixels are removed after 5 iterations.

We found that the noise correction performance of the algorithm of the present disclosure slowly increases with the segmentation size, however, for a segmentation size less than 8×8, the cost function achieves a local minimum in a few iterations.

To remove the edge effect from segmentation, each segment is padded on the edge to form an (M+2)×(M+2) image. The padded pixels are generated as follows:
1) For non-edge pixels relative to the original image, it is padded with its adjacent pixel in the original image;
2) For edge pixels relative to the original image, it is padded with itself. This modification is to avoid the edge effect from the Fourier transform. The padded image will be used as D in the noise reduction algorithm. In the final out-put image, the padded edges will be discarded. By performing this modification, the edge effect is eliminated except on the edge pixels of the final image.

Figure 16:
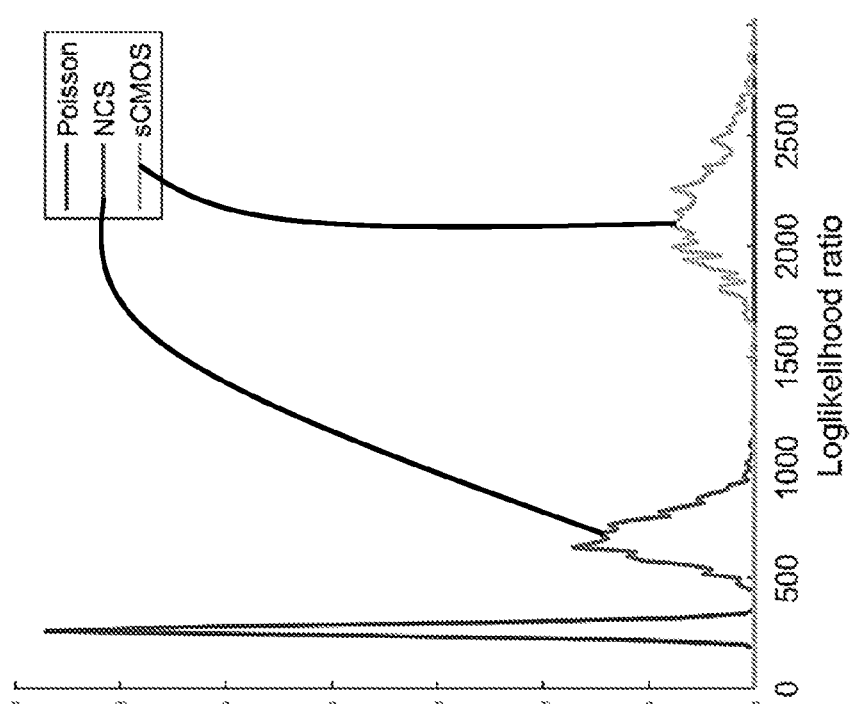
FIG. 16 is a graph of comparison of total measured loglikelihood ratio values of algorithm result (comparing to ideal no noise image), raw sCMOS data (comparing to ideal no noise image) and ideal camera (comparing to ideal no noise image). Y axis represents the histogram counts of 1000 trials for all three cases. Accordingly, camera-added noise is reduced by up to about 80%.

FIG. 16 is a graph of comparison of total measured loglikelihood ratio values of algorithm result (comparing to ideal no noise image), raw sCMOS data (comparing to ideal no noise image) and ideal camera (comparing to ideal no noise image). Y axis represents the histogram counts of 1000 trials for all three cases. The distribution of sCMOS's LLR is quite far from the ideal camera case (Poisson) where Algorithm (NCS) result is approaching closely to the ideal camera. This demonstrate the algorithm performance makes sCMOS sensor close to the ideal case (Poisson). FIG. 16 shows about a noise reduction of up to about 80% camera-added noise.

FIG. 17 is a diagram showing the components of an exemplary imaging system 101 for analyzing data and performing other analyses described herein, and related components. The system 101 includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or a leased line, as discussed below. sCMOS cameras or other data- or image-processing devices for imaging, and other devices herein can each include one or more processor(s) 186 or one or more of systems 120, 130, 140, and can each connect to one or more network(s) 150. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 186 can implement processes of various aspects described herein. Processor 186 and related components can, e.g., carry out processes for conducting sCMOS imaging and processing the of data received from a sCMOS camera.

Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the processor 186 but can be embodied or integrated completely or partially within the processor 186. In an example, processor 186 includes an ASIC including a central processing unit connected via an on-chip bus to one or more core(s) implementing function(s) of systems 120, 130, or 140.

The peripheral system 120 can include or be communicatively connected with one or more devices configured or otherwise adapted to provide digital content records to the processor 186 or to take action in response to signals or other instructions received from processor 186. For example, the peripheral system 120 can include imaging devices (including sCMOS cameras), signal processors and converters, or other data processors. The processor 186, upon receipt of digital content records from a device in the peripheral system 120, can store such digital content records in the data storage system 140.

Processor 186 can, via peripheral system 120, control subsystems of an imaging system. For example, processor 186 can direct imaging of an object of interest. Processor 186 can receive and process data of imaged objects.

The user interface system 130 can convey information in either direction, or in both directions, between a user 138 and the processor 186 or other components of system 101. The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated service digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM (Global System for Mobile Communications). Communication interface 115 can send and receives electrical, electromagnetic or optical signals that carry digital or analog data streams representing various types of information across network link 116 to network 150. Network link 116 can be connected to network 150 via a switch, gateway, hub, router, or other networking device.

In various aspects, system 101 can communicate, e.g., via network 150, with other data processing system(s) (not shown), which can include the same types of components as system 101 but is not required to be identical thereto. System 101 and other systems not shown communicatively connected via the network 150. System 101 and other systems not shown can execute computer program instructions to perform sCMOS imaging as described herein.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 186 can transfer data (e.g., using components of peripheral system 120). A processor-accessible memory can include one or more data storage device(s) that are volatile or nonvolatile, that are removable or fixed, or that are electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device or medium such as a hard drive. In this example, computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of block diagrams herein, and combinations of those, can be implemented by computer program instructions. Code memory 141 can also store data.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, "computer storage media" do not include communication media. That is, computer storage media do not include communications media consisting solely of a modulated data signal, a carrier wave, or a propagated signal, per se.

The program code can include computer program instructions that can be loaded into processor 186 (and possibly also other processors), and that, when loaded into processor 486, cause functions, acts, or operational steps of various aspects herein to be performed by processor 186 (or other processor). The program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The present disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless otherwise explicitly noted. The use of singular or plural in referring to "method" or "methods" and the like is not limiting. The word "or" is used in this disclosure in a non-exclusive sense, unless otherwise explicitly noted.

In the present disclosure, various processes are shown to be implemented with processors. It should be appreciated that these can be general purpose processors or specific application integrated circuits. It should also be appreciated that the processes described here can be implemented in field programmable gate arrays. These processes can be executed or calculated on these various hardware solutions at real-time for video processing or for still images. In the case of application specific integrated circuits, the processes can be divided based on various topologies known to a person having ordinary skill in the art. These various application specific integrated circuits will then communicate with each other to accomplish the entirety of the processes described here. Alternatively, two or more field programmable gate arrays can be interfaced to execute the processes described herein. Still alternatively, a combination of general purpose processors, field programmable gate arrays and application specific integrated circuits can be utilized to perform the steps of processes described herein.

It should also be appreciated that while sCMOS has been discussed as the camera platform, the techniques described herein can be applied to a variety of other platform known to a person having ordinary skill in the art. For example, the technique and processes described herein can be applied to a charge coupled device platform. While the read-out noise may be different in a charged coupled device platform as compared to a sCMOS camera, the same techniques can be applied to reduce noise in the charge coupled device cameras. Similarly, other camera platforms are within the scope of the present disclosure. In addition, while microscopy has been discussed throughout the present disclosure, it should be appreciated the present disclosure also apply to other areas such as telescopic cameras.

Those having ordinary skill in the art will recognize that numerous modifications can be made to the specific implementations described above. The implementations should not be limited to the particular limitations described. Other implementations may be possible.

The invention claimed is:

1. A system for reducing noise in a camera image, comprising:
   one or more processors;
   an imaging system including a camera with an electronic detector operatively coupled to the processors;
   wherein the processors are configured to reduce noise of camera images, the processors are configured to:
   receive input image data having Poisson noise originating from quantum nature of photons from the camera representing pixel data from a plurality of pixels, wherein each pixel is associated with a Gaussian noise generated by the associated pixel, and wherein the camera defining an optical transfer function (OTF) which in frequency domain represents a boundary within which occupies signal and noise, and outside of which is only noise wherein the noise is a combination of the Poisson noise and the Gaussian noise,
   segment the input image data to a plurality of segments, for each segment of the plurality:
   establish an initial segment image,
   pre-correct pixel data by modifying the pixel data to account for voltage offset and gain of each pixel based on a predetermined map of gain and offset,
   obtain an estimate of an output image by minimizing a cost function by reducing the noise from outside of the OTF-defined boundary and output and stitch the estimated image to other estimated and outputted image segments,
   output a noise reduced image including the stitched estimated images.

2. The system of claim 1, the step of estimating an output image includes:
   A—obtain a noise mask for the segment;
   B—obtain discrete Fourier transform (DFT) of an iterated segment image;
   C—obtain a noise contribution in the segment by applying the noise mask to the DFT of the segment;
   D—calculate a negative log-likelihood function for the segment based on pixel values, wherein the negative log-likelihood function represents a negative similarity (likelihood) measure using statistics between the iterated segment image and initial segment image;

E—calculate a cost function by adding the noise contribution to the negative log-likelihood function;

F—minimize the cost function by adjusting pixel values and thereby obtaining a new iterated segment image and repeating steps B-E in an iteration-minimization process; and G—output a noise reduced segment image when the cost function is minimized.

3. The system of claim 2, wherein the noise mask is based on the OTF of the camera.

4. The system of claim 3, wherein the noise mask is based on a high-pass raised-cosine filter represented by $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$, M is the noise mask and $\beta$ and T are adjustable parameters based on NA and $\gamma$ in which NA represent numerical aperture and $\gamma$ represents the detection wavelength.

5. The system of claim 4, wherein the high-pass raised-cosine filter is based on an OTF-weighted mask, expressed by $\beta=1$ and $T=\gamma/5.6NA$.

6. The system of claim 4, wherein the high-pass raised-cosine filter is based on an OTF noise-only mask, express by $\beta=0.2$ and $T=(1-\beta)\gamma/4NA$.

7. The system of claim 4, wherein the high-pass raised-cosine filter is based on an adjustable OTF mask, express by $$\beta = \frac{\frac{\pi}{2}\left(\frac{k_{max}}{w_0} - 1\right)}{\text{acos}(1-2h) + \frac{\pi}{2}\left(\frac{k_{max}}{w_0} - 1\right)},$$

$$T = \frac{1-\beta}{2w_0},$$

$$k_{max} = \frac{\sqrt{2}}{2 \text{ pixelsize}}, \quad w_0 = \frac{wNA}{\lambda},$$

where, the width w can be adjusted from $10^{-6}$ to 2 and the height h can be adjusted from 0 to 1.

8. The system of claim 4, wherein the high-pass raised-cosine filter is based on an adjustable OTF mask that is based on at least two parameters: width and height.

9. The system of claim 7, wherein the width can vary from $10^{-6}$ to 2 NA/$\gamma$, and the height can vary from 0 to 1.

10. The system of claim 4, wherein the high-pass raised-cosine filter is based on user defined-mask.

11. A method of reducing noise from a camera image, comprising:
receiving an input image data having Poisson noise originating from quantum nature of photons from a camera having an electronic detector representing pixel data from a plurality of pixels, wherein each pixel is associated with a Gaussian noise generated by the associated pixel, and wherein the camera defining an optical transfer function (OTF) which in frequency domain represents a boundary within which occupies signal and noise, and outside of which is only noise wherein the noise is a combination of the Poisson noise and the Gaussian noise, segmenting the input image data to a plurality of segments, for each segment of the plurality:
establishing an initial segment image,
pre-correcting pixel data by modifying the pixel data to account for voltage offset and gain of each pixel based on a predetermined map of gain and offset,
obtaining an estimate of an output image by minimizing a cost function by reducing the noise from outside of the OTF-defined boundary and output and stitch the estimated image to other estimated and outputted image segments, outputting a noise reduced image including the stitched estimated images.

12. The method of claim 11, the step of estimating an output image includes:
A—obtaining a noise mask for the segment;
B—obtaining discrete Fourier transform (DFT) of an iterated segment image;
C—obtaining a noise contribution in the segment by applying the noise mask to the DFT of the segment;
D—calculating a negative log-likelihood function for the segment based on pixel values, wherein the negative log-likelihood function represents a negative similarity (likelihood) measure between the iterated segment image and initial segment image;
E—calculating a cost function by adding the noise contribution to the negative log-likelihood function;
F—minimizing the cost function by adjusting pixel values and thereby obtaining a new iterated segment image and repeating steps B-E in an iteration-minimization process; and
G—outputting a noise reduced segment image when the cost function is minimized.

13. The method of claim 12, wherein the noise mask is based on the OTF of the camera.

14. The method of claim 13, wherein the noise mask is based on a high-pass raised-cosine filter represented by $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$, M is the noise mask and $\beta$ and T are adjustable parameters based on NA and $\gamma$ in which NA represent numerical aperture and $\gamma$ represents the detection wavelength.

15. The method of claim 14, wherein the high-pass raised-cosine filter is based on an OTF-weighted mask, expressed by $\beta=1$ and $T=\gamma/5.6NA$.

16. The method of claim 14, wherein the high-pass raised-cosine filter is based on an OTF noise-only mask, express by $\beta=0.2$ and $T=(1-\beta)\gamma/4NA$.

17. The method of claim 14, wherein the high-pass raised-cosine filter is based on an adjustable OTF mask, express by $$\beta = \frac{\frac{\pi}{2}\left(\frac{k_{max}}{w_0} - 1\right)}{\text{acos}(1-2h) + \frac{\pi}{2}\left(\frac{k_{max}}{w_0} - 1\right)},$$

-continued $$T = \frac{1-\beta}{2w_0},$$

$$k_{max} = \frac{\sqrt{2}}{2\,pixelsize}, \quad w_0 = \frac{wNA}{\lambda},$$

where, the width w can be adjusted from $10^{-6}$ to 2 and the height h can be adjusted from 0 to 1.

18. The method of claim 14, wherein the high-pass raised-cosine filter is based on an adjustable OTF mask that is based on at least two parameters: width and height.

19. The method of claim 18, wherein the width can vary from $10^{-6}$ to 2 NA/γ, and the height can vary from 0 to 1.

20. The method of claim 14, wherein the high-pass raised-cosine filter is based on user defined-mask.

21. A system for reducing noise in a camera image, comprising:
 one or more processors;
 a camera with an electronic detector operatively coupled to the processors;
 wherein the processors are configured to reduce noise of camera images, the processors are configured to:
 receive input image data from the camera representing pixel data from a plurality of pixels,
 segment the input image data to a plurality of segments, for each segment of the plurality:
 establish an initial segment image,
 pre-correct pixel data by modifying the pixel data to account for voltage offset and gain of each pixel based on a predetermined map of gain and offset,
 obtain an estimate of an output image by minimizing a cost function and output and stitch the estimated image to other estimated and outputted image segments,
 output a noise reduced image including the stitched estimated images, wherein the step of estimating an output image includes:
 A—obtain a noise mask for the segment;
 B—obtain discrete Fourier transform (DFT) of an iterated segment image;
 C—obtain a noise contribution in the segment by applying the noise mask to the DFT of the segment;
 D—calculate a negative log-likelihood function for the segment based on pixel values, wherein the negative log-likelihood function represents a negative similarity (likelihood) measure using statistics between the iterated segment image and initial segment image;
 E—calculate a cost function by adding the noise contribution to the negative log-likelihood function;
 F—minimize the cost function by adjusting pixel values and thereby obtaining a new iterated segment image and repeating steps B-E in an iteration-minimization process; and
 G—output a noise reduced segment image when the cost function is minimized,
 wherein the noise mask is based on an optical transfer function (OTF) of the camera, and
 wherein the noise mask is based on a high-pass raised-cosine filter represented by $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$, M is the noise mask and β and T are adjustable parameters based on NA and γ in which NA represent numerical aperture and γ represents the detection wavelength.

22. A method of reducing noise from a camera image, comprising:
 receiving an input image data from a camera having an electronic detector representing pixel data from a plurality of pixels,
 segmenting the input image data to a plurality of segments, for each segment of the plurality:
 establishing an initial segment image,
 pre-correcting pixel data by modifying the pixel data to account for voltage offset and gain of each pixel based on a predetermined map of gain and offset,
 obtaining an estimate of an output image by minimizing a cost function and output and stitch the estimated image to other estimated and outputted image segments,
 outputting a noise reduced image including the stitched estimated images,
 wherein the step of estimating an output image includes:
  A—obtaining a noise mask for the segment,
  B—obtaining discrete Fourier transform (DFT) of an iterated segment image,
  C—obtaining a noise contribution in the segment by applying the noise mask to the DFT of the segment,
  D—calculating a negative log-likelihood function for the segment based on pixel values, wherein the negative log-likelihood function represents a negative similarity (likelihood) measure between the iterated segment image and initial segment image,
  E—calculating a cost function by adding the noise contribution to the negative log-likelihood function,
  F—minimizing the cost function by adjusting pixel values and thereby obtaining a new iterated segment image and repeating steps B-E in an iteration-minimization process,
  G—outputting a noise reduced segment image when the cost function is minimized,
 wherein the noise mask is based on an optical transfer function (OTF) of the camera, and
 wherein the noise mask is based on a high-pass raised-cosine filter represented by $$M(k_x, k_y) = \begin{cases} 1, & k_r > \frac{1+\beta}{2T} \\ 0, & k_r < \frac{1-\beta}{2T} \\ \frac{1}{2} - \frac{1}{2}\cos\left[\frac{\pi T}{\beta}\left(k_r - \frac{1-\beta}{2T}\right)\right], & \text{otherwise} \end{cases}$$

where $k_r = \sqrt{k_x^2 + k_y^2}$, M is the noise mask and β and T are adjustable parameters based on NA and γ in which NA represent numerical aperture and γ represents the detection wavelength.

* * * * *